(12) United States Patent
Gajewski

(10) Patent No.: US 7,232,391 B2
(45) Date of Patent: Jun. 19, 2007

(54) SYNCHRONOUS DRIVE APPARATUS AND METHODS

(75) Inventor: Witold Gajewski, Richmond Hill (CA)

(73) Assignee: Litens Automotive, Ontario (CA)

( * ) Notice: Subject to any disclaimer, the term of this patent is extended or adjusted under 35 U.S.C. 154(b) by 0 days.

(21) Appl. No.: 11/101,597

(22) Filed: Apr. 8, 2005

(65) Prior Publication Data

US 2005/0187054 A1 Aug. 25, 2005

Related U.S. Application Data

(62) Division of application No. 10/294,933, filed on Nov. 15, 2002.

(60) Provisional application No. 60/333,118, filed on Nov. 27, 2001, provisional application No. 60/369,558, filed on Apr. 4, 2002.

(51) Int. Cl.
*F16H 55/30* (2006.01)

(52) U.S. Cl. .......................................... 474/141; 74/437

(58) Field of Classification Search ................ 74/434, 74/437; 474/87, 141, 148
See application file for complete search history.

(56) References Cited

U.S. PATENT DOCUMENTS

| 515,449 | A | 2/1894 | Scovell |
|---|---|---|---|
| 571,086 | A | 11/1896 | Fulton et al. |
| 613,756 | A | 11/1898 | Buddle |
| 1,650,449 | A | 11/1927 | Jaeger |
| 1,936,117 | A | 11/1933 | Peschl |
| 1,963,314 | A | 6/1934 | Savell et al. |
| 2,941,413 | A | 6/1960 | Huber et al. |
| 2,477,441 | A | 4/1969 | Cole |
| 3,583,250 | A | 6/1971 | Kongelka |
| 3,752,035 | A | 8/1973 | Cozzy et al. |
| 3,830,212 | A | 8/1974 | Seino et al. |
| 3,858,454 | A | 1/1975 | Duff |
| 4,193,324 | A | 3/1980 | Marc |
| 4,337,056 | A | 6/1982 | Bruns |
| 4,515,577 | A | 5/1985 | Cathey et al. |

(Continued)

FOREIGN PATENT DOCUMENTS

DE 2 014 537 10/1970

(Continued)

*Primary Examiner*—Vicky A. Johnson
(74) *Attorney, Agent, or Firm*—Pillsbury Winthrop Shaw Pittman, LLP

(57) ABSTRACT

A synchronous drive apparatus and method, wherein the apparatus comprises a plurality of rotors comprising at least a first and a second rotor. The first rotor has a plurality of teeth for engaging the engaging sections of an elongate drive structure, and the second rotor has a plurality of teeth for engaging the engaging section of the elongate drive structure. A rotary load assembly is coupled to the second rotor. The elongate drive structure engages about the first and second rotors. The first rotor is arranged to drive the elongate drive structure and the second rotor is arranged to be driven by the elongate drive structure. One of the rotors has a non-circular profile having at least two protruding portions alternating with receding portions. The rotary load assembly is such as to present a periodic fluctuating load torque when driven in rotation, in which the angular positions of the protruding and receding portions of the non-circular profile relative to the angular position of the second rotor, and the magnitude of the eccentricity of the non-circular profile, are such that the non-circular profile applies to the second rotor an opposing fluctuating corrective torque which reduces or substantially cancels the fluctuating load torque of the rotary load assembly.

34 Claims, 17 Drawing Sheets

U.S. PATENT DOCUMENTS

| | | | |
|---|---|---|---|
| 4,810,237 A | 3/1989 | Mantovaara | |
| 4,865,577 A | 9/1989 | Freudenstein | |
| 4,913,684 A | 4/1990 | Mantovaara et al. | |
| 5,492,390 A | 2/1996 | Kugelmann, Sr. | |
| 5,772,546 A | 6/1998 | Warszewski | |
| 5,882,025 A | 3/1999 | Runnels | |
| 5,935,046 A | 8/1999 | Maresh | |
| 6,019,692 A | 2/2000 | Kojima et al. | |
| 6,189,639 B1 | 2/2001 | Fuse et al. | |
| 6,932,037 B2 * | 8/2005 | Simpson et al. ......... | 123/90.17 |
| 2003/0087714 A1 | 5/2003 | Todd | |
| 2003/0104886 A1 | 6/2003 | Gajewski | |
| 2006/0063626 A1* | 3/2006 | Kelm et al. ................. | 474/141 |
| 2006/0073926 A1* | 4/2006 | Kelm et al. ................. | 474/141 |

FOREIGN PATENT DOCUMENTS

| | | |
|---|---|---|
| DE | 2 338 865 | 2/1974 |
| DE | 37 39 336 | 6/1989 |
| DE | 43 16 877 | 11/1993 |
| DE | 43 31 482 | 3/1994 |
| DE | 195 20 508 | 12/1996 |
| DE | 196 49 397 | 6/1998 |
| DE | 200 08 042 U | 9/2000 |
| GB | 1 175 505 | 12/1969 |
| JP | 63-88368 | 4/1988 |
| JP | 63-97830 | 4/1988 |
| JP | 63-106453 | 5/1988 |
| JP | 63-145858 | 6/1988 |
| JP | 1-95538 | 6/1989 |
| JP | 1-244116 | 9/1989 |
| JP | 1-288657 | 11/1989 |
| JP | 3-297792 | 12/1991 |
| JP | 4-39444 | 2/1992 |
| JP | 4-165148 | 6/1992 |
| JP | 5-86892 | 4/1993 |
| JP | 5-164191 | 6/1993 |
| JP | 61-59037 | 6/1994 |
| JP | 6-239284 | 8/1994 |
| JP | 61-62635 | 2/1995 |
| JP | 8-14058 | 1/1996 |
| JP | 10-176506 | 6/1998 |
| JP | 10-266814 | 10/1998 |
| JP | 10-266868 | 10/1998 |
| JP | 10-274052 | 10/1998 |
| JP | 2001-304374 | 10/2001 |
| JP | 2001-348809 | 12/2001 |
| JP | 2001-349416 | 12/2001 |

* cited by examiner

SYNCHRONOUS DRIVE APPARATUS AND METHODS

This application claims benefit of and is a divisional application of U.S. patent application Ser. No. 10/294,933, filed Nov. 15, 2002, which claims priority to U.S. Provisional Application of Gajewski, Application Nos. 60/333,118, filed Nov.27, 2001 and 60/369,558, filed Apr. 4, 2002, the entirety of each of the three applications is hereby incorporated into the present application by reference thereto, respectively.

FIELD OF INVENTION

The present invention relates to a synchronous drive apparatus, a method of operating a synchronous drive apparatus and a method of constructing a synchronous drive apparatus. The invention relates to the elimination or reduction of mechanical vibrations, in particular but not exclusively in internal combustion engines.

BACKGROUND OF INVENTION

Synchronous drive systems, such as timing belt-based systems, are widely used in motor vehicles, as well as in industrial applications. In motor vehicles, for example, timing belts or chains are used to drive the camshafts that open and close the engine intake and exhaust valves. Also other devices such as water pumps, fuel pumps etc. can be driven by the same belt or chain.

Internal combustion engines produce many types of mechanical vibrations during their operation, and these vibrations are usually transmitted through the timing belt or chain in the synchronous drive system. A particularly intense source of mechanical vibrations is given by the intake and exhaust valves and the camshafts that open and close those intake and exhaust valves. Opening and closing the intake and exhaust valves leads to a type of vibration known as torsional vibration. When the frequency of these vibrations is close to natural frequency of the drive, system resonance occurs. In resonance the torsional vibrations and the span tension fluctuations are at their maximum.

As flexible mechanical structures, timing belts and chains are particularly susceptible to the deleterious effects of mechanical vibrations. Mechanical vibrations transmitted through the timing belt or chain cause fluctuations in belt or chain tension, which can lead to increased wear and reduced belt or chain life. Vibrations may also cause timing errors, and result in undesirable amounts of noise.

Conventional techniques to attenuate the vibrations include increasing the tension on the belt or chain and installing camshaft dampers. Camshaft dampers connect a source of inertia to a camshaft sprocket by a vibration-absorbing rubber or silicone. However, increasing the belt or chain tension increases the noise level and reduces the useful life of the belt or chain. Installing camshaft dampers is also an undesirable solution, because of their cost and/or because of lack of space.

In DE-A-195 20 508 (Audi AG), there is disclosed a wrapped belt drive for an internal combustion engine, the timing belt being wrapped around two driven pulleys coupled to the camshaft of the engine, and one drive pulley coupled to the crankshaft of the engine. The objective of the invention is to counter the torsional vibrations which are found in such belt drives. It is proposed to provide an additional torsional vibration through which the critical resonance can be moved to a range where it can either be tolerated, or does not arise. It is proposed in the citation to produce torsional vibrations by an "out of round" pulley, which is shown as consisting of one of the camshaft pulleys. The out of round pulley which is shown has four protruding portions and four receding portions arranged regularly around the pulley. It is said that the variations in the pulley profile introduce torsionals to the timing belt at the incoming or outgoing spans of the driven pulleys, which are superimposed on the dynamics of the combustion engine, and thus shift or eliminate the critical resonance range. A figure is shown which is said to show a graph of torsional vibrations of the timing drive in degrees camshaft over the RPM of the crankshaft. The total amplitude is shown, and also the dominant vibration of the second order and the less relevant vibrations of the fourth order are shown. A single example of a magnitude of eccentricity of an out of round pulley is given, but no teaching is given as to how to select the magnitude of the eccentricity, and the angular alignment of the out of round rotor relative to the other rotors, for any given conditions of type of engine, type of drive belt, and type of load. As has been mentioned, the objective of the invention in the citation is to counter the torsional vibrations in the belt drive, and not to deal with the source of the vibrations.

In Japanese Utility Model JP 62-192077 (Patent Bulletin No. HEI 1-95538) of 1987 (Hatano et al/Mitsubishi), there is disclosed a tension equalising driving device which transmits the rotation of a drive pulley to a driven pulley by a belt drive such as a timing belt in an internal combustion engine. There is shown a timing belt arrangement in which a toothed pulley of the drive shaft of a camshaft is driven by an oval timing belt driving sprocket connected to the drive shaft of an internal combustion engine. The teaching of the citation is that the drive pulley is made oval in shape so as to give the drive belt a tension fluctuation with a phase opposite to that of the tension fluctuation in the belt produced by the rotation of the internal combustion engine. It is said that the drive pulley is installed in such a way that it gives the drive belt a tension fluctuation with a phase opposite to that of the tension fluctuation of the belt already present. The oval drive sprocket is said to be a tension equalising device, and is provided to equalise the tension in the drive belt. A figure is shown of a graph illustrating the tension caused by the valve train torque and the tension caused by the tension equalising device (the oval drive sprocket), the two tensions being shown of the same magnitude and opposite phase. There is no specific teaching given as to how to determine the magnitude of the eccentricity of the oval drive pulley, nor how to relate the angular position of the drive pulley to the camshaft pulley which is driven by the belt. In addition, as discussed in Japanese Application No. HEI 9-73581 (Patent Bulletin No. HEI 10-266868) of 1997 (Kubo/Mitsubishi), it was subsequently determined by the Applicant in JP 62-192077 (HEI 1-95538) that the use of an oval sprocket as a crank sprocket has a number of difficulties and problems and is thus not desirable.

SUMMARY OF INVENTION

In accordance with the present invention in a first aspect, there is provided a synchronous drive apparatus, comprising a continuous-loop elongate drive structure having a plurality of engaging sections. A plurality of rotors comprising at least a first and a second rotor, wherein the first rotor has a plurality of teeth for engaging the engaging sections of the elongate drive structure, and the second rotor has a plurality of teeth for engaging the engaging section of the elongate drive structure. A rotary load assembly is coupled to the second rotor. The elongate drive structure engages about the first and second rotors. The first rotor is arranged to drive the elongate drive structure and the second rotor is arranged to be driven by the elongate drive structure. One of the rotors has a non-circular profile having at least two protruding portions alternating with receding portions. The rotary load assembly is such as to present a periodic fluctuating load torque when driven in rotation, in which the angular positions of the protruding and receding portions of the non-circular profile relative to the angular position of the second rotor, and the magnitude of the eccentricity of the non-circular profile, are such that the non-circular profile applies to the second rotor an opposing fluctuating corrective torque which reduces or substantially cancels the fluctuating load torque of the rotary load assembly.

In preferred forms of the apparatus, the non-circular profile is such as to produce the opposing fluctuating corrective torque by periodic elongation and contraction of the spans of the elongate drive structure adjoining the rotor on which the non-circular profile is formed. The elongate drive structure has a drive span on the tight side of the rotor on which the non-circular profile is formed, the angular position of the non-circular profile being within +/−15 degrees (preferably within +/−5 degrees) of an angular position for which a maximum elongation of the drive span coincides with a peak value of the fluctuating load torque of the rotary load assembly. Most preferably the angular position of the non-circular profile is that for which a maximum elongation of the drive span substantially coincides with a peak value of the fluctuating load torque of the rotary load assembly.

Also in preferred forms of the apparatus, the magnitude of the eccentricity of the non-circular profile is such that the fluctuating corrective torque has an amplitude in the range of 70% to 110% (preferably in the range 90% to 100%) of the amplitude of the fluctuating load torque at a predetermined selected set of operating conditions of the synchronous drive apparatus. Most preferably, the amplitude of the fluctuating corrective torque is substantially equal to the amplitude of the fluctuating load torque.

In this specification, unless otherwise indicated, the term amplitude of a periodically varying item means peak-to-peak amplitude.

Thus, the magnitude of the eccentricity of the non-circular profile is determined with reference to the amplitude of the fluctuating load torque of the rotary load assembly. In some arrangements the amplitude of the fluctuating load torque may be substantially constant, and in other arrangements the amplitude of the fluctuating load torque may vary. Where the amplitude of the fluctuating load torque is constant, the magnitude of the eccentricity is determined with reference to that substantially constant amplitude of fluctuating load torque. Where the amplitude of the fluctuating load torque varies, the value thereof which is used to determine the magnitude of the eccentricity will be selected according to the operating conditions in which it is desired to eliminate or reduce the unwanted vibrations. For example where the fluctuating load torque of the rotary load assembly varies, the eccentricity may be determined with reference to the amplitude of the fluctuating load torque when determined at conditions such that it is a maximum, or for example when determined at the natural resonance frequency of the apparatus. For example in a diesel internal combustion engine, the most troublesome region for vibration may be at the maximum fuel delivery by the fuel pump. In these conditions, the eccentricity is determined with reference to the amplitude of the fluctuating load torque when determined at these conditions. Similarly in a petrol or gasoline internal combustion engine, the most troublesome region may be at the region of natural resonance of the timing drive, and in such a case the eccentricity is determined with reference to such conditions.

It is to be appreciated that the invention finds application in many forms of synchronous drive apparatus other than in internal combustion engines. Also, the non-circular profile may be provided in many different locations within the drive apparatus. For example a non-circular profile may be provided on the first rotor (which drives the elongate drive structure), and/or on the second rotor (which is driven by the elongate drive structure), and/or may be provided on a third rotor, for example an idler rotor urged into contact with the continuous loop elongate drive structure.

However, the invention finds particular use when installed in an internal combustion engine and the first rotor comprises a crankshaft sprocket. In some arrangements the internal combustion engine is a diesel engine, and the rotary load assembly comprises a rotary fuel pump. As has been mentioned in such arrangements, it may be arranged that the magnitude of the eccentricity of the non-circular profile is such that the fluctuating corrective torque has an amplitude substantially equal to the amplitude of the fluctuating load torque when determined at conditions of maximum delivery of the fuel pump. In other arrangements, the internal combustion engine may be a petrol or gasoline engine and the rotary load assembly may be a camshaft assembly.

In determining the angular position of the non-circular profile, consideration may be given to various reference parameters of the profile and the rotor on which it is formed. In some arrangements the non-circular profile has at least two reference radii, each reference radius passing from the centre of the rotor on which the non-circular profile is formed and through the centre of a protruding portion of the non-circular profile, and the angular position of the non-circular profile is related to a reference direction of the rotor on which the non-circular profile is formed, the reference direction being the direction of the hub load force produced by engagement of the elongate drive structure with that rotor. The angular position of the non-circular profile is such that, when the fluctuating load torque of the rotary load assembly is at a maximum, the annular position of a reference radius is preferably within a range of 90° to 180° from the reference direction taken in the direction of rotation of the rotor on which the non-circular profile is formed. Preferably, the range comprises a range of 130° to 140°. Most preferably, the angular position of the reference radius is substantially at 135° from the reference direction taken in the direction of rotation of the rotor on which the non-circular profile is formed.

It will be appreciated that many different forms of non-circular profile may be provided, for example a generally oval profile, or a profile having three or four protruding portions arranged regularly around the rotor. The choice of profile will depend upon other components of the synchronous drive apparatus. Examples which may be provided include the following, namely: the internal combustion engine is a 4-cylinder inline combustion engine and the crankshaft sprocket has an oval contoured profile; the internal combustion engine is a 4-cylinder inline combustion engine and the camshaft sprocket has a generally rectangular contoured profile; the internal combustion engine is a 4-cylinder inline combustion engine, and the camshaft sprocket has a generally rectangular contoured profile and the crankshaft sprocket has an oval contoured profile; the internal combustion engine is a 3-cylinder inline combustion engine and the camshaft sprocket has a generally triangular contoured profile; the internal combustion engine is a 6-cylinder inline combustion engine and the crankshaft sprocket has a generally triangular contoured profile; the internal combustion engine is a 6-cylinder V6 combustion engine and the camshaft sprocket has a generally triangular contoured profile; the internal combustion engine is an 8-cylinder V8 combustion engine and the camshaft sprocket has a generally rectangular contoured profile; or the internal combustion engine is a 2-cylinder combustion engine and the camshaft sprocket has an oval contoured profile.

In most embodiments of the invention as set out above, the protruding portions and receding portions will be generally of the same magnitude, giving a regular non-circular profile. However depending upon the circumstances of the torsional vibrations to be removed, a non-regular profile may be provided. Furthermore, the protruding portions referred to above may constitute major protruding portions and the receding portions constitute major receding portions, and the non-circular profile may include additional minor protruding portions of lesser extent than the major protruding portions. These minor protruding portions may be adapted to produce additional, minor, fluctuating corrective torque patterns in the torque applied to the second rotor, for the purpose of reducing or substantially cancelling subsidiary order fluctuating load torque presented by the rotary load assembly, in particular for example in order to reduce or substantially cancel fourth order fluctuating load torques presented by the rotary load assembly.

It is to be appreciated that where features of the invention are set out herein with regard to apparatus according to the invention, such features may also be provided with regard to a method according to the invention (namely a method of operating a synchronous drive apparatus, or a method of constructing a synchronous drive apparatus), and vice versa.

In particular, there is provided in accordance with another aspect of the invention a method of operating a synchronous drive apparatus which comprises a continuous-loop elongate drive structure having a plurality of engaging sections. A plurality of rotors comprises at least a first and a second rotor. The first rotor has a plurality of teeth engaging the engaging sections of the elongate drive structure, and the second rotor has a plurality of teeth engaging the engaging section of the elongate drive structure. A rotary load assembly is coupled to the second rotor. One of the rotors has a non-circular profile having at least two protruding portions alternating with receding portions. The rotary load assembly presents a periodic fluctuating load torque when driven in rotation.

The method comprises the steps of engaging the elongate drive structure about the first and second rotors, driving the elongate drive structure by the first rotor, and driving the second rotor by the elongate drive structure, and applying to the second rotor by means of the non-circular profile an opposing fluctuating corrective torque which reduces or substantially cancels the fluctuating load torque of the rotary load assembly.

In accordance with yet another aspect of the invention, there may be provided a method of constructing a synchronous drive apparatus, comprising:
(i) assembling components comprising a continuous-loop elongate drive structure having a plurality of engaging sections, a plurality of rotors comprising at least a first and a second rotor, the first rotor having a plurality of teeth for engaging the engaging sections of the elongate drive structure, and the second rotor having a plurality of teeth for engaging the engaging section of the elongate drive structure, and a rotary load assembly coupled to the second rotor; and
(ii) engaging the elongate drive structure about the first and second rotors, the first rotor being arranged to drive the elongate drive structure and the second rotor being arranged to be driven by the elongate drive structure, and one of the rotors having a non-circular profile having at least two protruding portions alternating with receding portions, the rotary load assembly being such as to present a periodic fluctuating load torque when driven in rotation; and
(iii) determining the angular positions of the protruding and receding portions of the non-circular profile relative to the angular position of the second rotor, and the magnitude of the eccentricity of the non-circular profile, to be such that the non-circular profile applies to the second rotor an opposing fluctuating corrective torque which reduces or substantially cancels the fluctuating load torque of the rotary load assembly.

In a preferred form of the method of constructing the synchronous drive apparatus, the method includes:
(i) arranging the non-circular profile to produce the opposing fluctuating corrective torque by periodic elongation and contraction of the spans of the elongate drive structure adjoining the rotor on which the non-circular profile is formed, the elongate drive structure having a drive span between the rotor on which the non-circular profile is formed and the second rotor, the drive span being positioned on the tight side of the rotor on which the non-circular profile is formed; and
(ii) determining the angular positions of the protruding and receding portions of the non-circular profile by arranging the angular position of the non-circular profile to be within ±15 degrees of an angular position for which a maximum elongation of the drive span coincides with a peak value of the fluctuating load torque of the rotary load assembly.

Also in a preferred form of the invention the- method of constructing a synchronous drive apparatus includes determining the magnitude of the eccentricity of the non-circular profile is determined by the following steps:
(i) measuring the amplitude of the fluctuating load torque of the rotary load assembly at a predetermined selected set of operating conditions of the synchronous drive apparatus;
(ii) calculating the required amplitude of periodic elongation and contraction of the drive span by the following formula:

$$L = \frac{T}{rk}$$

L=the amplitude of the periodic elongation and contraction of the said drive span;
T=the amplitude of the fluctuating load torque of the rotary load assembly at a predetermined selected set of operating conditions of the synchronous drive apparatus;
r=the radius of the second rotor:
k=the stiffness coefficient of the elongate drive structure defined as $$k = \frac{dF}{dL}$$

where dF is the force required to produce an increase of length dL in the length of the structure.
(iii) producing and recording data to relate empirically a series of values of (a) the divergence from circular of the protruding and receding portions of the non-circular profile and (b) the resulting amplitude of the periodic elongation and contraction of the drive span; and
(iv) selecting from the data the corresponding eccentricity to give the required amplitude of the periodic elongation and contraction of the drive span.

The present invention arises from an understanding that the best way to eliminate or reduce torsional vibrations in a synchronous drive system is to arrange a non-circular profile on one of the rotors which is such as to cancel or reduce the fluctuating load torque in the load assembly, rather than trying to cancel or reduce the varying tension in the continuous loop drive structure, as was attempted in the prior art. Indeed it is found essential to provide a varying tension in the elongate drive structure, in order to cancel or reduce the fluctuating load torque in the load assembly. The present invention allows the cancellation, or reduction, of the source of the torsional excitation, rather than endeavouring to deal with the effects of torsionals by cancelling variations in tension in the elongate drive structure.

Thus although it has been known to provide a non-circular profile on one of the rotors in a synchronous drive assembly, the methods chosen to determine the magnitude of the eccentricity, and the timing of the protruding and receding portions of the non-circular profile, have not been such as to produce the required result. By way of example, in a typical internal combustion engine, if the eccentricity is chosen such as to try to equalise the tension in a drive belt, the eccentricity will typically be considerably too great to cancel the torsional vibrations in the load assembly. In a typical international combustion engine, there will be a resonant frequency at, say, 2000 to 2500 rpm. If the eccentricity of the non-circular profile is chosen to attempt to cancel any tension variation in the drive belt in the region of resonance, then typically the eccentricity will be set at much more tension than is required to cancel the vibrations. The result will be excessive wear in the drive belt and the various sprockets, and also the system will not be successful in reducing vibration.

Considering another manner in which the prior art arrangements were deficient, it is important to arrange the timing (translated into angular position) of the non-circular profile, to be correctly related to the timing (translated into angular positioning) of the fluctuations in load torque in the load assembly. Conveniently the relative timing of the non-circular profile and the fluctuating load torque of the rotary load assembly is determined in relation to a periodic elongation and contraction of a drive span of the elongate drive structure between the first and second rotors on the tight side of the first rotor. The most preferable arrangement in accordance with the invention is that the angular position of the non-circular profile is that for which a maximum elongation of the drive span of the elongate drive structure substantially coincides with a peak value of the fluctuating load torque of the rotary load assembly. However, the invention can provide substantial reduction in vibration if the timing is set within a range of plus/minus 15° of the preferred angular position. A particularly preferred range is plus/minus 5° of the preferred angular position.

In contrast, in the prior art it has been attempted to set the eccentricity of the non-circular profile with reference to the tension in the elongate drive structure. However in a typical internal combustion engine the peak tension in the drive belt varies in its timing according to the region of the rpm range which is examined. Typically the peak tension in the drive belt occurs at one timing stage for the resonant frequency of the engine, and occurs at an earlier timing in the cycle for the rev range below resonance, and occurs at a later part of the timing cycle for the region of the rev range above the resonant condition. Thus, depending upon which conditions are selected in the prior art in order to attempt to equalise the tension in the drive belt, the timing of the eccentricity of the non-circular profile may be ahead of, or may lag behind, the preferred position for cancelling the fluctuating load torque in the load assembly.

Thus to summarise, the present invention provides for the correct selection of the eccentricity and the timing of the non-circular profile, to be that which most advantageously cancels or reduces the fluctuating load torque in the load assembly.

DESCRIPTION OF THE DRAWINGS

Embodiments of the invention will now be described by way of example with reference to the accompanying drawings in which.

DESCRIPTION OF THE INVENTION

Figure 1:
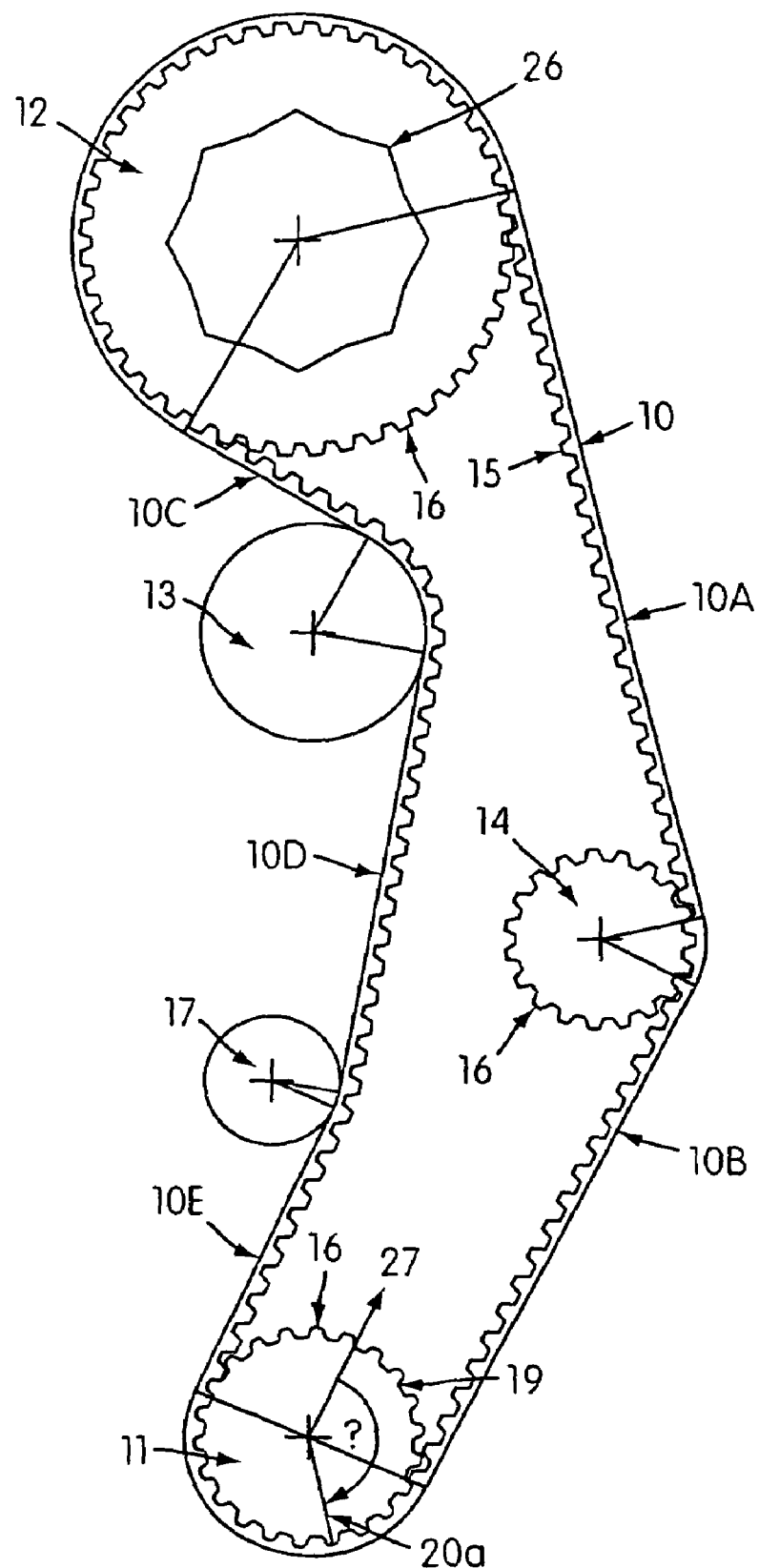
FIG. 1 is a schematic illustration of a synchronous drive apparatus for a motor vehicle internal combustion engine, embodying the invention.

FIG. 1 is a diagrammatic representation of a synchronous drive apparatus for a motor vehicle internal combustion engine, embodying the invention. The apparatus comprises a continuous loop elongate drive structure 10, first and second rotors 11 and 12, and further rotors 13, 14 and 17. The continuous loop elongate drive structure 10 is provided by a conventional timing belt having teeth 15 together with intervening valleys which constitute a plurality of engaging sections of the continuous loop elongate drive structure. Each rotor 11 and 12 is provided by a sprocket having a plurality of teeth 16 for engaging the valleys between the teeth 15 of the timing belt 10. The sprocket 11 is coupled to the crankshaft (not shown) of an internal combustion engine, and the sprocket 12 is coupled to a rotary load assembly (not shown) which is constituted by a camshaft 26 of the internal combustion engine. The timing belt 10 is engaged about the first and second rotors 11 and 12, the first rotor 11 being arranged to drive the belt 10 and the second rotor 12 being arranged to be driven by the belt 10. The rotor 14 also has teeth 16 and consists of a sprocket for driving other elements of the internal combustion engine, such as a water pump, and the rotor 13 is preferably for a belt tensioner bearing on a non-toothed side of the timing belt 10, to tension the belt in known manner. Rotor 17 is preferably for a fixed idler pulley bearing on the non-toothed side of timing belt 10.

Figure 4A:
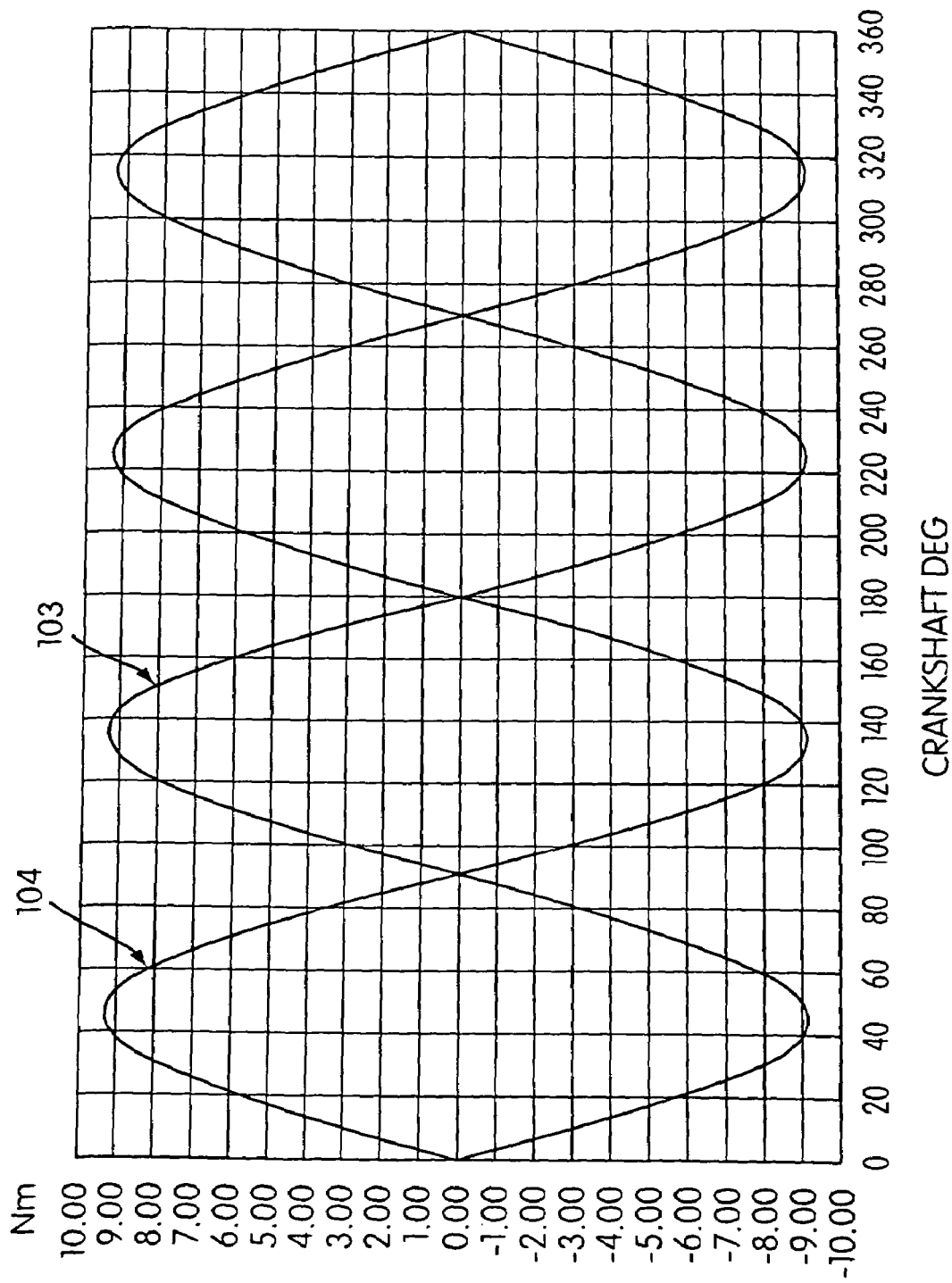
FIG. 4a shows a graph of a fluctuating load torque at the camshaft of an SOHC internal combustion engine and a fluctuating corrective torque generated by an oval crankshaft sprocket illustrated in FIGS. 1 and 2, all graphs being taken over one crankshaft revolution.
Figure 4B:
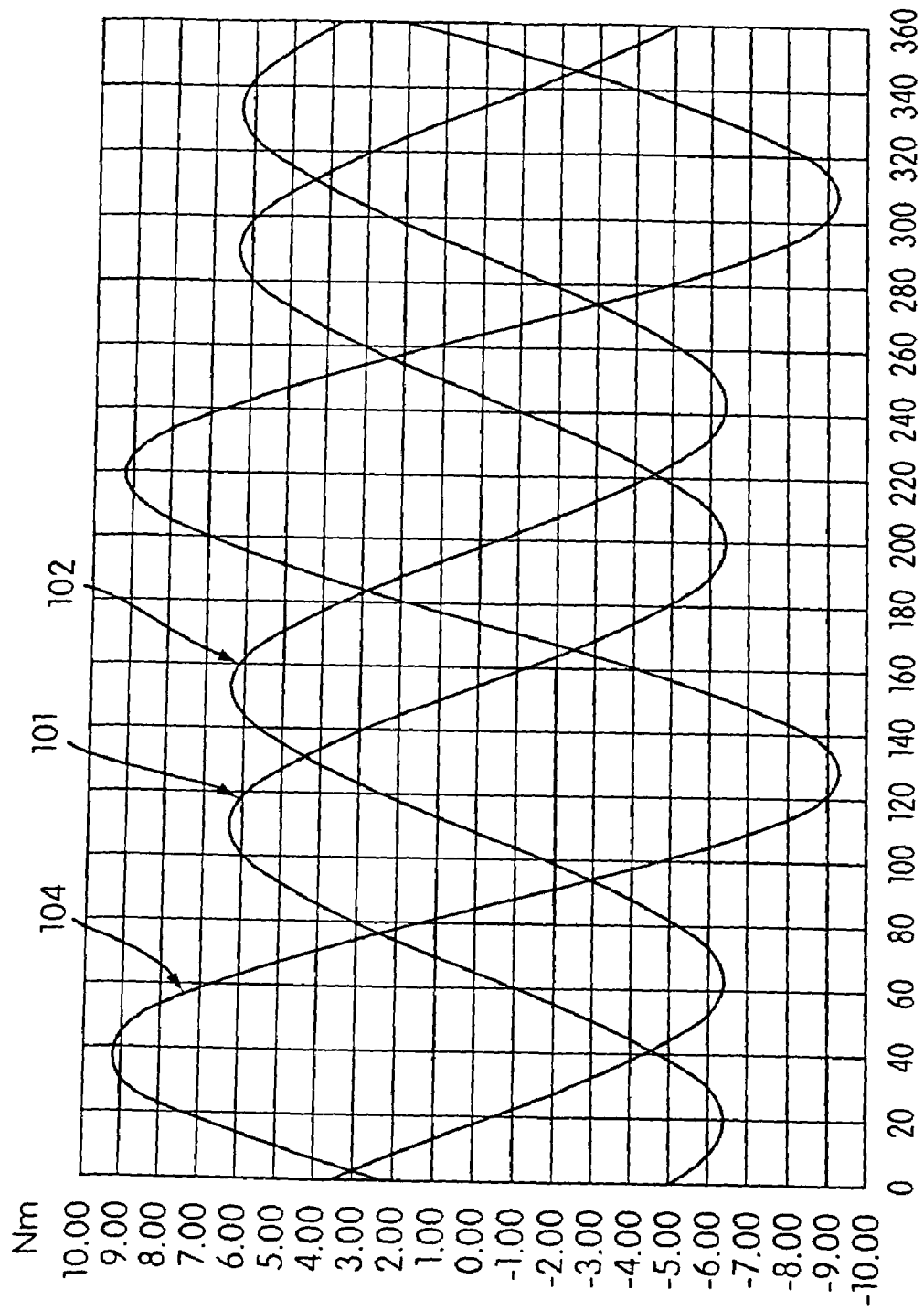
FIG. 4b shows a graph of a fluctuating load torque which arises from the intake cam of an DOHC internal combustion engine, a fluctuating load torque which arises from the exhaust cam, and a fluctuating corrective torque generated by an oval crankshaft sprocket in the engine illustrated in FIG. 3, all graphs being taken over one crankshaft revolution.
Figure 5A:
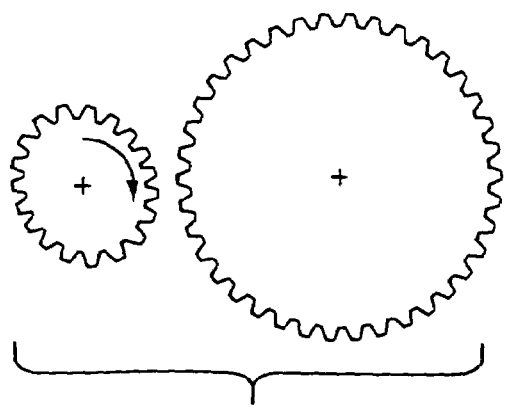
FIGS. 5a to 5d show different combinations of crankshaft and camshaft sprockets embodying the invention in 4-cylinder and 3-cylinder engines.
Figure 5B:
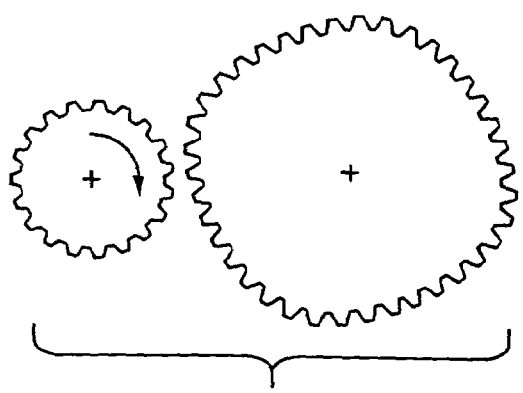
Figure 5C:
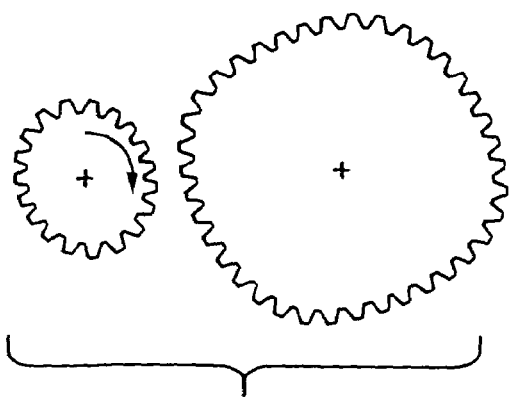
Figure 5D:
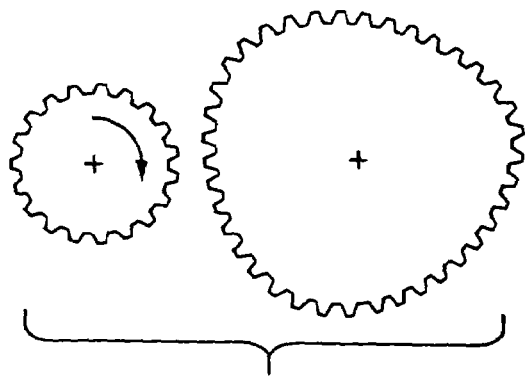
Figure 6A:
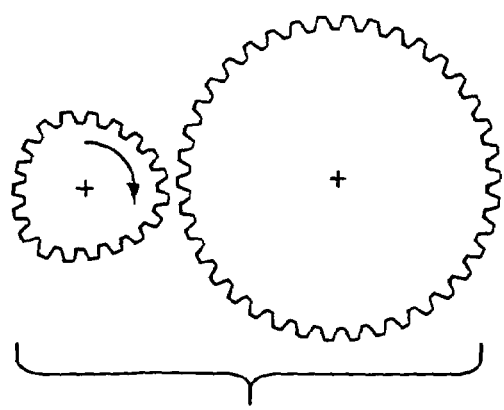
FIGS. 6a to 6d show different combinations of crankshaft and camshaft sprockets embodying the invention in 6-cylinder, 8-cylinder and 2-cylinder engines.
Figure 6B:
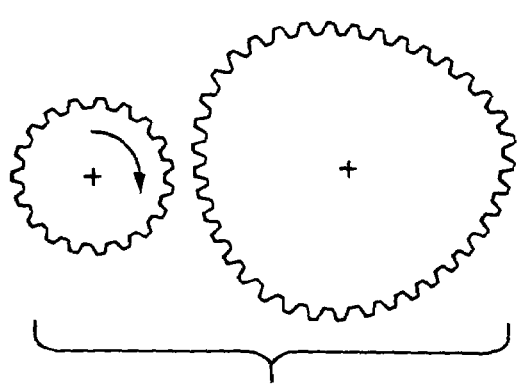
Figure 6C:
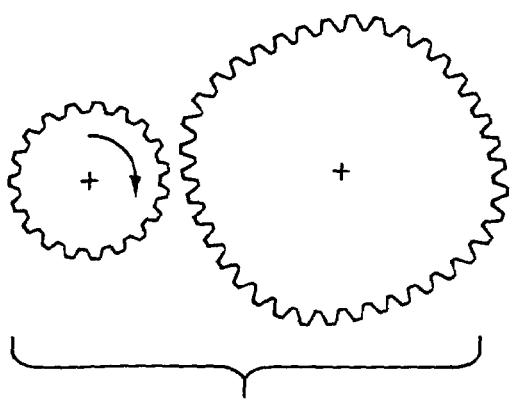
Figure 6D:
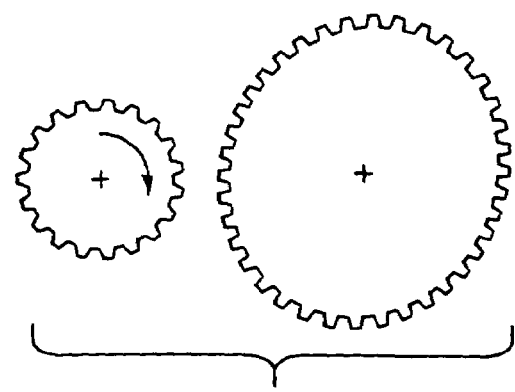

In a known form of a synchronous drive apparatus, the crankshaft sprocket would have a circular profile. In such a case, the synchronous drive apparatus is prone to vibrations, known as torsional vibrations, which arise from the opening and closing of the intake and exhaust valves of the internal combustion engine by the overhead camshaft. The source of the excitations is illustrated in FIGS. 4a and b. FIG. 4a illustrates the fluctuating load torque 103 applied to the camshaft in a SOHC engine and FIG. 4b illustrates the same for a DOHC engine. FIG. 4b shows the variation of camshaft torque over a single cycle of the engine, indicating how the intake torque shown by the curve 101 varies with degrees of rotation of the engine, and how the exhaust torque profile 102 varies in the same way.

In accordance with the embodiment of the present invention shown in FIG. 1 for a SOHC engine, the crankshaft sprocket 11 has a non-circular profile (as shown in exaggerated form in FIG. 2) indicated generally by reference numeral 19. The non-circular profile 19 is, in the particular embodiment described, an oval having a major axis 20 and a minor axis 21. The profile 19 has two protruding portions 22 and 23 and has two receding portions 24 and 25.

Figure 2:
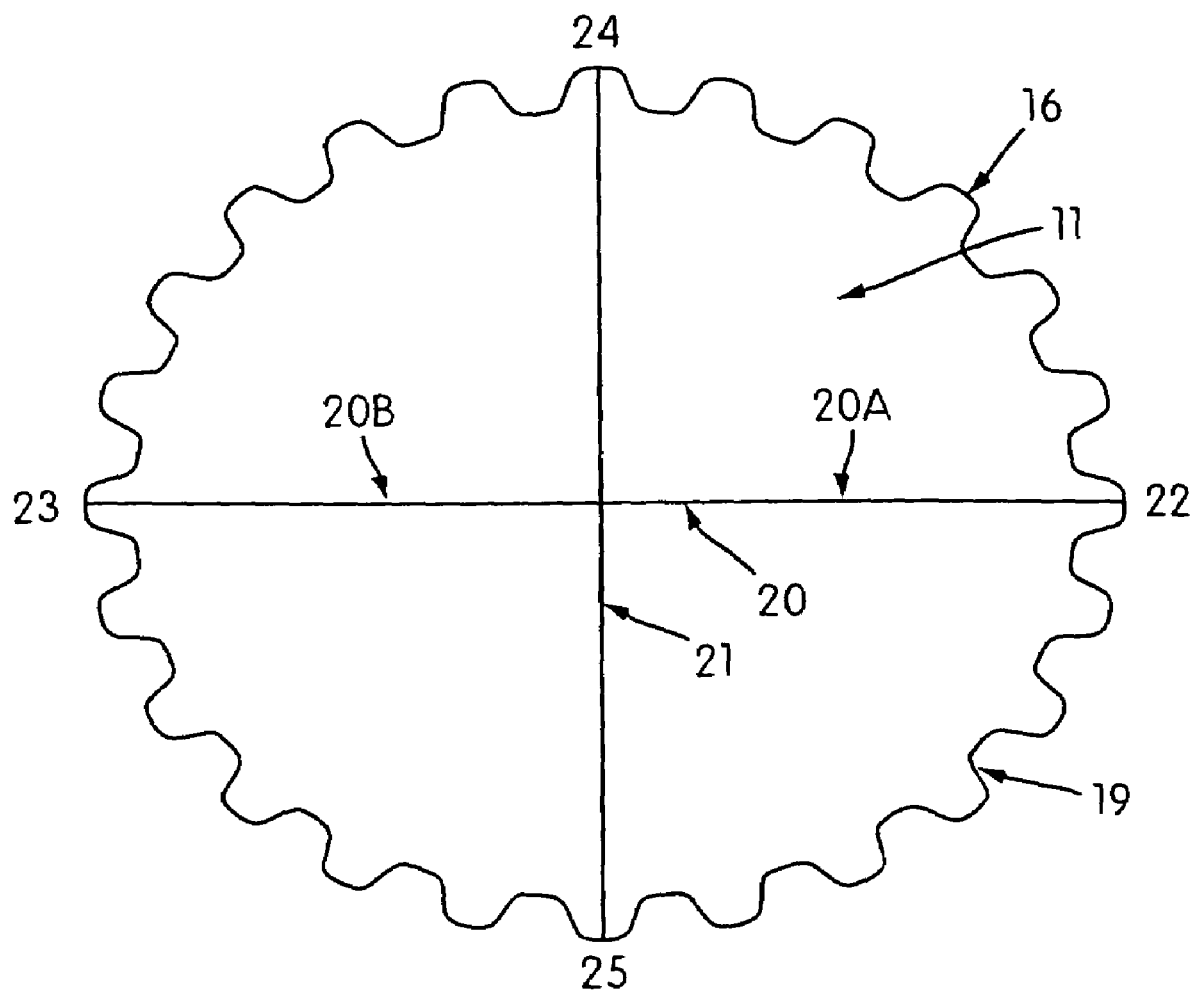
FIG. 2 is an enlarged view of the crankshaft sprocket shown in FIG. 1.
Figure 3:
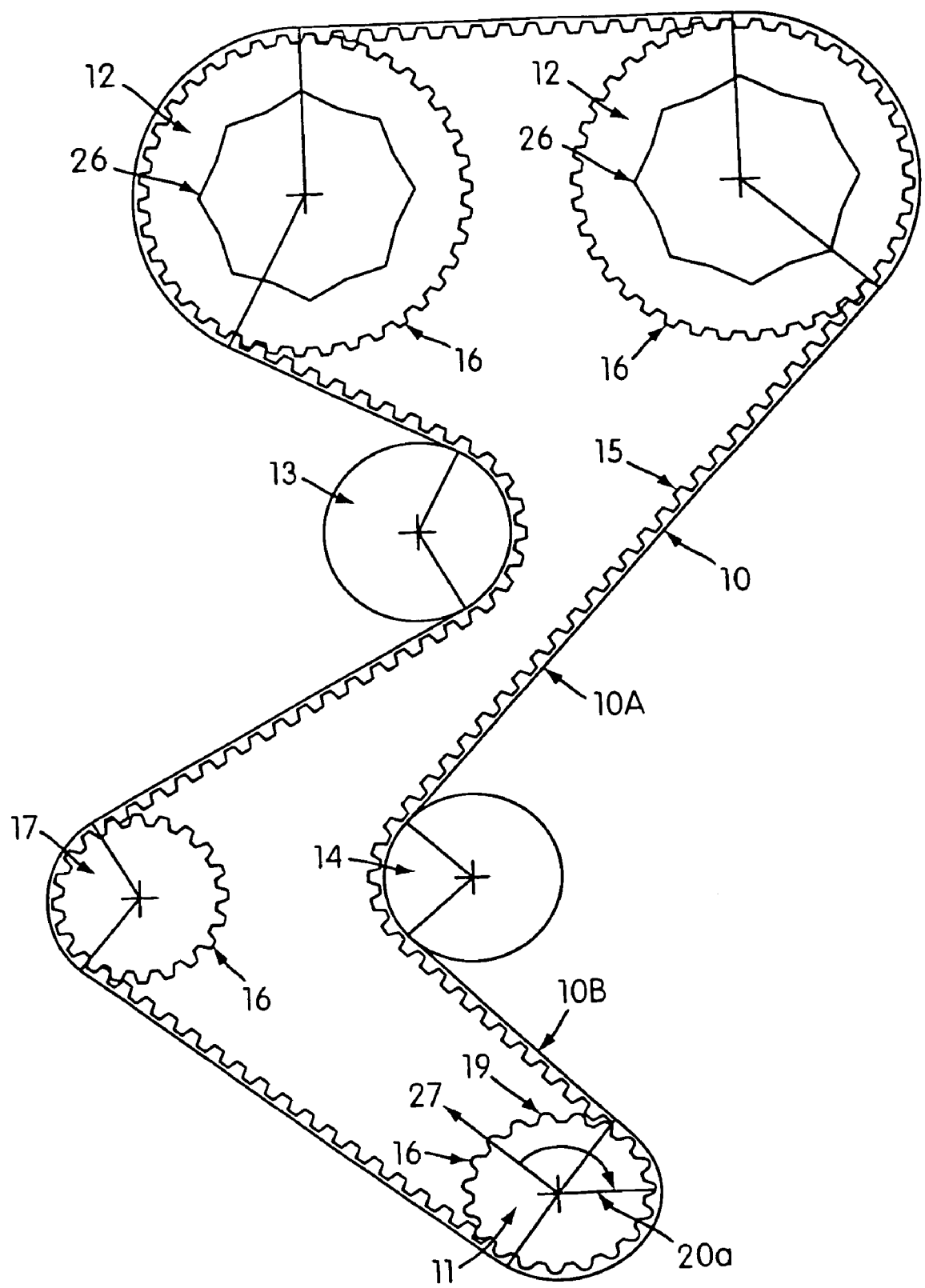
FIG. 3 is a schematic illustration of the synchronous drive apparatus of an internal combustion engine in DOHC engine configuration.

The provision of the oval profile 19 on the sprocket 11 as shown in FIG. 2, generates a fluctuating corrective torque, which is applied by the belt 10 to the second rotor 12. This fluctuating corrective torque is shown at 104 in FIG. 4a. In the preferred situation, the total fluctuating load torque 103 is opposed by the overall corrective torque 104. Preferably the corrective torque 104 is 180° out of phase with the overall load torque 103, and the peak to peak amplitude of the fluctuating corrective torque 104 is made equal to the peak to peak amplitude of the overall fluctuating load torque 103.

In accordance with the embodiment of the invention using the oval profile 19 shown in FIG. 2, the angular positions of the protruding and receding portions 22 to 24 of the non-circular profile 19 relative to the angular position of the second rotor 12, and the magnitude of the eccentricity of the non-circular profile 19, are such that the non-circular profile 19 applies to the second rotor 12 an opposing fluctuating corrective torque 104 which substantially cancels the fluctuating load torque 103 of the rotary load assembly 26.

The determination of the timing and magnitude of the eccentricity of the non-circular profile 19 will now be described in more detail. In FIG. 1 the spans between the various rotors are indicated as 10A between rotor 12 and rotor 14, 10B between rotor 14 and rotor 11, 10C between rotor 12 and rotor 13, and 10D between rotor 13 and rotor 17 and 10E between rotor 17 and rotor 11. The span between the first rotor 11 and the second rotor 12, indicated as 10A, 10B, is referred to as the drive span between the two rotors, it being positioned on the tight side of the first rotor 11 on which the non-circular profile 19 is formed. The span between the first rotor 11 and second rotor 12 which is indicated as 10C, 10D, 10E is referred as the slack side, although of course the belt is under tension on both sides. The torsional vibrations to be eliminated are formed by the fluctuating load torque on the rotary load assembly (the camshaft 26) and in accordance with the present invention this is reduced or substantially cancelled by the application of an opposing fluctuating corrective torque to the camshaft 26 by means of the timing belt 10. The opposing fluctuating corrective torque is produced by the non-circular profile 19 by periodic elongation and contraction of the spans 10A 10B and 10C 10D 10E, adjoining the rotor 11 on which the non-circular profile is formed. In preferred forms of the invention, the angular position of the non-circular profile 19 is set as closely as possible to be that for which a maximum elongation of the drive span 10A 10B substantially coincides with a peak value of the fluctuating load torque of the camshaft 26. It may not always be possible to arrange this exactly, and advantage is obtained in accordance with the invention if the angular position of the non-circular profile is within +/−15 degrees of the preferred angular position, more preferably within +/−5 degrees.

With regard to the particular case illustrated, and referring to FIGS. 1 and 2, the oval profile 19 has two reference radii 20a and 20b, which together form the major axis 20 of the oval. Each reference radius 20a, 20b passes from the centre of the rotor 11 and through the centre of the respective protruding portion 22, 23. The angular position of the non-circular profile 19 is related to a reference direction of the rotor 11, the reference direction being the direction of a vector or imaginary line 27 that bisects the angle or sector of wrap of the continuous loop drive structure 10 around the rotor 11. This vector that bisects the angle of wrap is in the same direction as the hub load force produced by engagement of the belt 10 with the rotor 11 when the belt drive system is static. It should be appreciated, however, that the hub load force direction changes dynamically during operation of the belt drive system. The timing of the non-circular profile 19 is set to be such that, at the time when the fluctuating load torque on the second rotor 12 is at a maximum, the angular position of the reference radius 20a is within a range of 90° to 180° from the reference direction of the angle of wrap bisection 27, taken in the direction of rotation of the rotor 11, preferably within a range of 130° to 140°. Assuming that the assembly of FIG. 1 is shown at the instant when the fluctuating load torque on the second rotor 12 is at a maximum, then the preferred timing of the non-circular profile 19 is as shown in FIG. 1, namely that the angle between the reference radius 20a and the bisection direction 27 is 135°, as indicated by the angle θ.

It is to be appreciated that in this specification, where the term "reference radius" is used for a non-circular profile 19, the reference parameter measured is the radius of a notional circle passing through the associated protruding portion, and is not a radius of the entire profile, since this entire profile is essentially non-circular. The term reference radius is used merely to indicate the distance between the centre of the axis of the rotor on which the profile is formed, to the maximum extent of the profile at the relevant protruding portion.

Consideration will now be given to the determination of the magnitude of the eccentricity of the non-circular profile 19 in the specific embodiment shown. In summary, the magnitude of the eccentricity of the profile 19 is preferably set to be such that the fluctuating corrective torque 104 shown in 4a has an amplitude substantially equal to, and phase substantially opposite to, the amplitude of the fluctuating load torque 103 shown in FIG. 4a. However advantage is still found in embodiments where the amplitude of the fluctuating corrective torque 104 is in the range of 75% to 110% of the amplitude of the fluctuating load torque 103, more preferably in the range 90% to 100%. Where the fluctuating load torque 103 has a substantially constant amplitude over the rev range of the engine, the amplitude of the corrective torque 104 is merely made substantially equal to the constant amplitude of the fluctuating load torque.

The practical steps of determining the magnitude of the eccentricity may be as follows. First the amplitude of the fluctuating load torque 103 of the camshaft 26 is measured at the selected set of operating conditions, in this case at the maximum amplitude of the fluctuating load torque. Next there is calculated the required amplitude of period elongation and contraction of the drive span 10a, 10b by the following formula:

$$L = \frac{T}{rk}$$

where:
L=the amplitude of the periodic elongation and contraction of the drive span which is required;
T=the amplitude of the fluctuating load torque of the camshaft 26, which has been measured at maximum amplitude;
r=the radius of the second rotor 12: and
k=the stiffness coefficient of the belt 10.

The stiffness coefficient k is obtained from the formula $$k = \frac{dF}{dL}$$

where dF is the force required to produce an increase of length dL in the of the structure.

By way of example of the calculations above, the amplitude of the fluctuating load torque T may be 10 Nm (zero to peak), and the radius of the rotor 12 may be 50 mm. This gives a maximum force F required to provide the required fluctuating corrective torque of F=200N. In the example discussed, the required change in span length is obtained by dividing the tension of 200N by the stiffness coefficient k, which for example for a typical belt may be 400 N/mm. This gives required amplitude of elongation and contraction of the timing belt of 0.5 mm (zero to peak).

The next step is to calculate the eccentricity required to provide this length of elongation and contraction at a timing stage when the major axis 20 of the ellipse is set at θ=135° as shown in FIG. 1. A theoretical calculation of this value is difficult to achieve, so that the calculation of the eccentricity is arrived at by the equivalent of a "look-up" table. This is done by producing and recording data to relate empirically a series of values of (i) the divergence from circular of the protruding and receding portions of the non-circular profile and (ii) the resulting amplitude of the periodic elongation and contraction of the drive span. The required eccentricity is then selected from the data to give the required amplitude of the periodic elongation and contraction of the drive span.

The data bank which is produced, to provide the "look-up" table consists of a table of values of the amplitude of elongation and contraction of the drive span 10A and 10B, for various values of the eccentricity of the oval profile 19 along the major axis. Examples of such data are given in the following table, Table 1. The reference circle used for comparison is a circle having a diameter equal to the average of the major axis length 20 and the minor axis length 21. The eccentricity of the oval profile 19 can be determined, in the example shown, by considering the divergence of the outline from the reference circle at the major axis 20.

| Difference between selected oval reference outline and reference circle | Amplitude of periodic elongation and contraction of drive span 10A, 10B |
| --- | --- |
| 0.5 mm | 0.25 mm |
| 1.0 mm | 0.49 mm |
| 1.5 mm | 0.74 mm |

Figure 15:
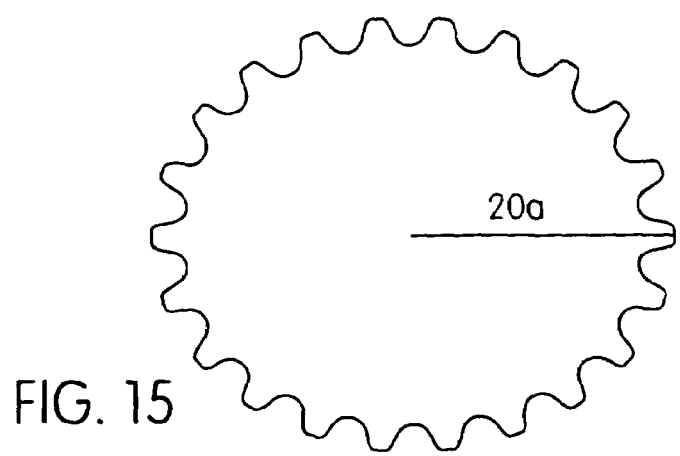
FIGS. 15, 16 and 17 show a computer generated virtual representation of an oval crankshaft profile embodying the invention, the profile being stepped on by an angular advance of one tooth in FIG. 16 relative to FIG. 15, and in FIG. 17 relative to FIG. 16.
Figure 16:
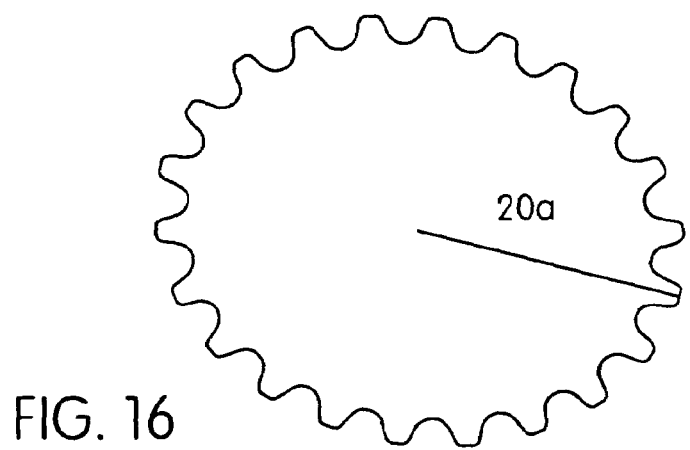
Figure 17:
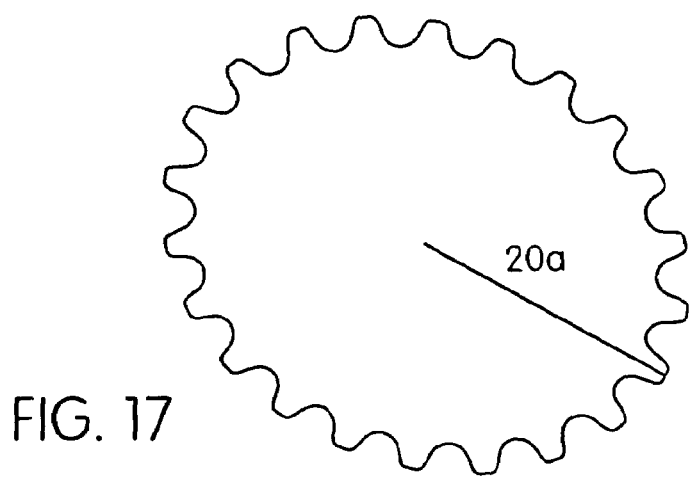

This table may be derived for example by producing a computer simulation of the oval profile 19, and stepping this through a series of angular advancements of, say one tooth at a time, for example as shown in FIGS. 15, 16 and 17. For each of these steps, the computer simulation is arranged to provide an indication of the elongation or contraction of the equivalent drive span 10A, 10B, for a particular length of major axis giving the radius 20A. On the computer simulation, the reference radius 20A is then varied, and a further series of data are produced for the new radius 20A. The purpose of stepping the profile through the positions shown at FIGS. 15, 16 and 17, is to determine empirically the position at which the maximum extension of the corresponding drive span 10A, 10B takes place. Having determined that, the appropriate data is extracted, for the maximum length of the span 10A, 10B, which is set against the corresponding eccentricity of the reference radius 20A. FIGS. 15, 16 and 17 show how the amplitude of elongation may be determined by using virtual prototyping.

FIGS. 5a to 5d show different combinations of crankshaft and camshaft sprockets for 4-cylinder and 3-cylinder engines. FIGS. 6a to 6d show different combinations of crankshaft and camshaft sprockets for 6-cylinder, 8-cylinder and 2-cylinder engines.

Figure 7A:
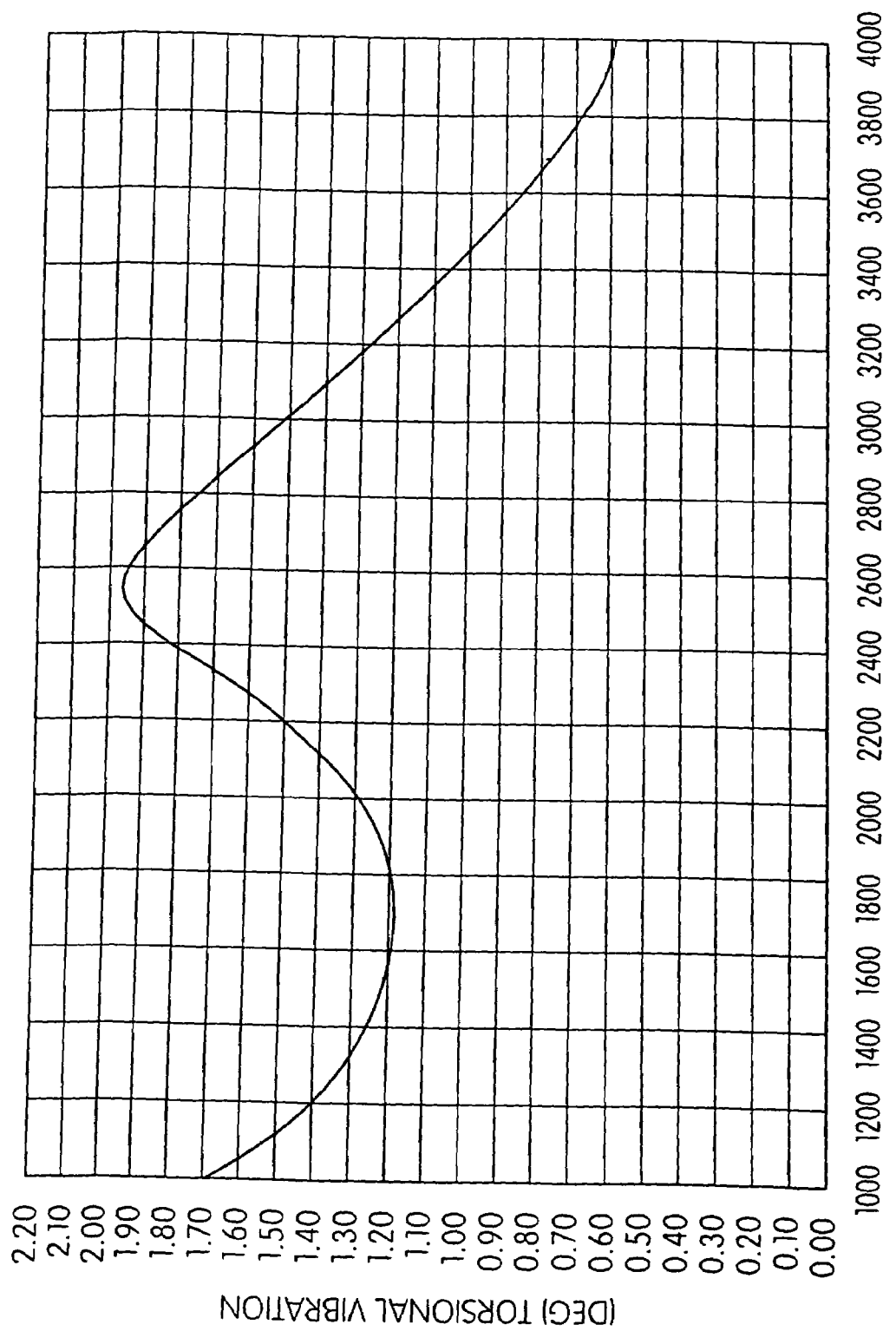
FIG. 7a is a graph illustrating the magnitude of torsional vibrations in an internal combustion engine at different engine speeds, the vertical axis indicating the amplitude of torsional vibrations in degrees of movement of the camshaft, and the horizontal axis indicating engine speed in rpm, the graph indicating the situation in a known engine, having a round crankshaft sprocket.
Figure 7B:
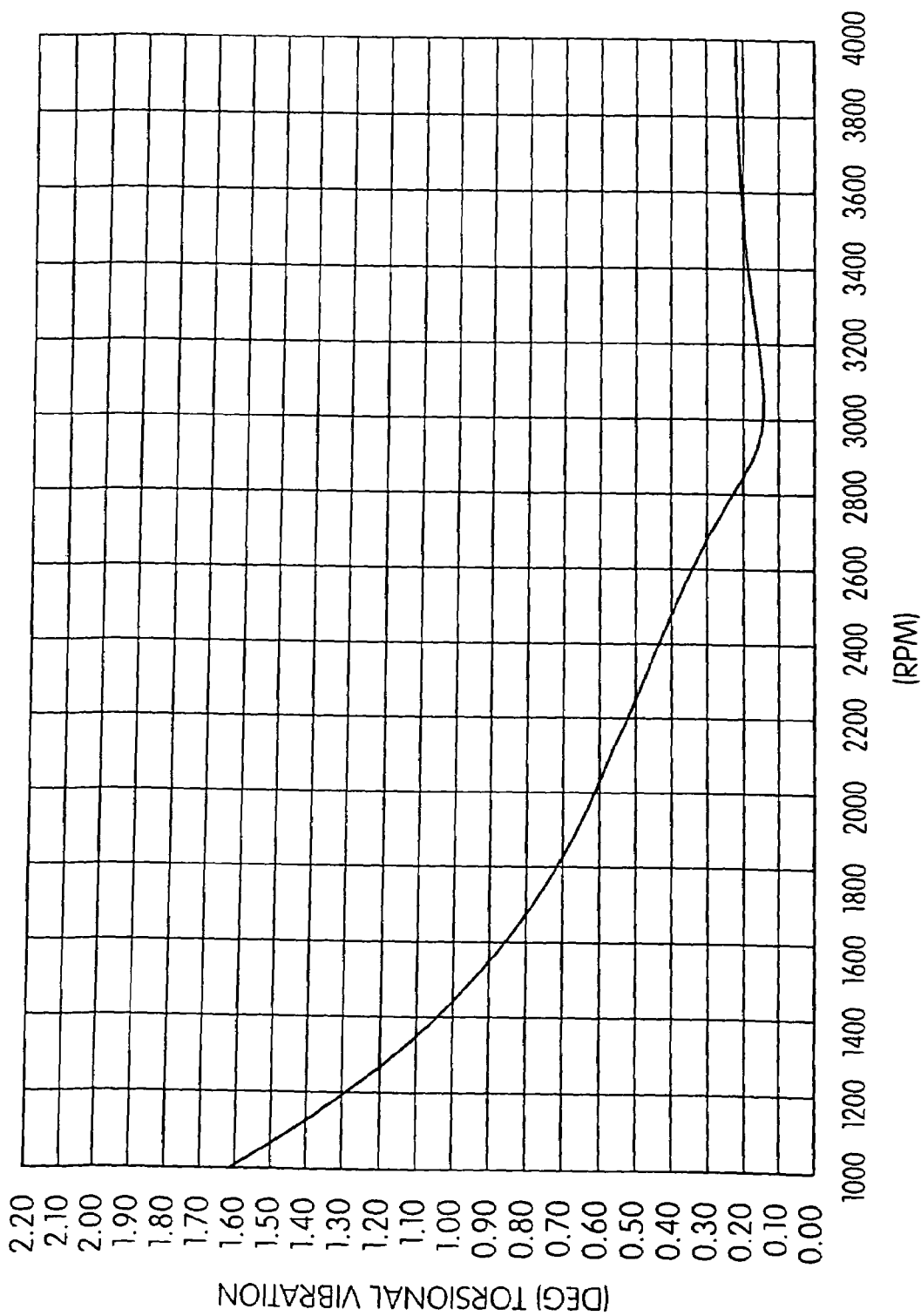
FIG. 7b is a graph illustrating the magnitude of torsional vibrations in an internal combustion engine at different engine speeds, the vertical axis indicating the amplitude of torsional vibrations in degrees of movement of the camshaft, and the horizontal axis indicating engine speed in rpm, the graph indicating the situation for a synchronous drive apparatus embodying the invention, utilising an oval crankshaft sprocket.

FIG. 7a shows the amplitude of camshaft torsional vibrations in degrees of rotary vibration versus the engine speed in rpm for a round crankshaft sprocket. FIG. 7b shows the amplitude of camshaft torsional vibrations in degrees of rotary vibration versus the engine speed in rpm for an oval crankshaft sprocket. FIG. 7b shows that the torsionals are significantly reduced. Only torsionals coming from the crankshaft remain. The resonance has been cancelled.

Figure 8A:
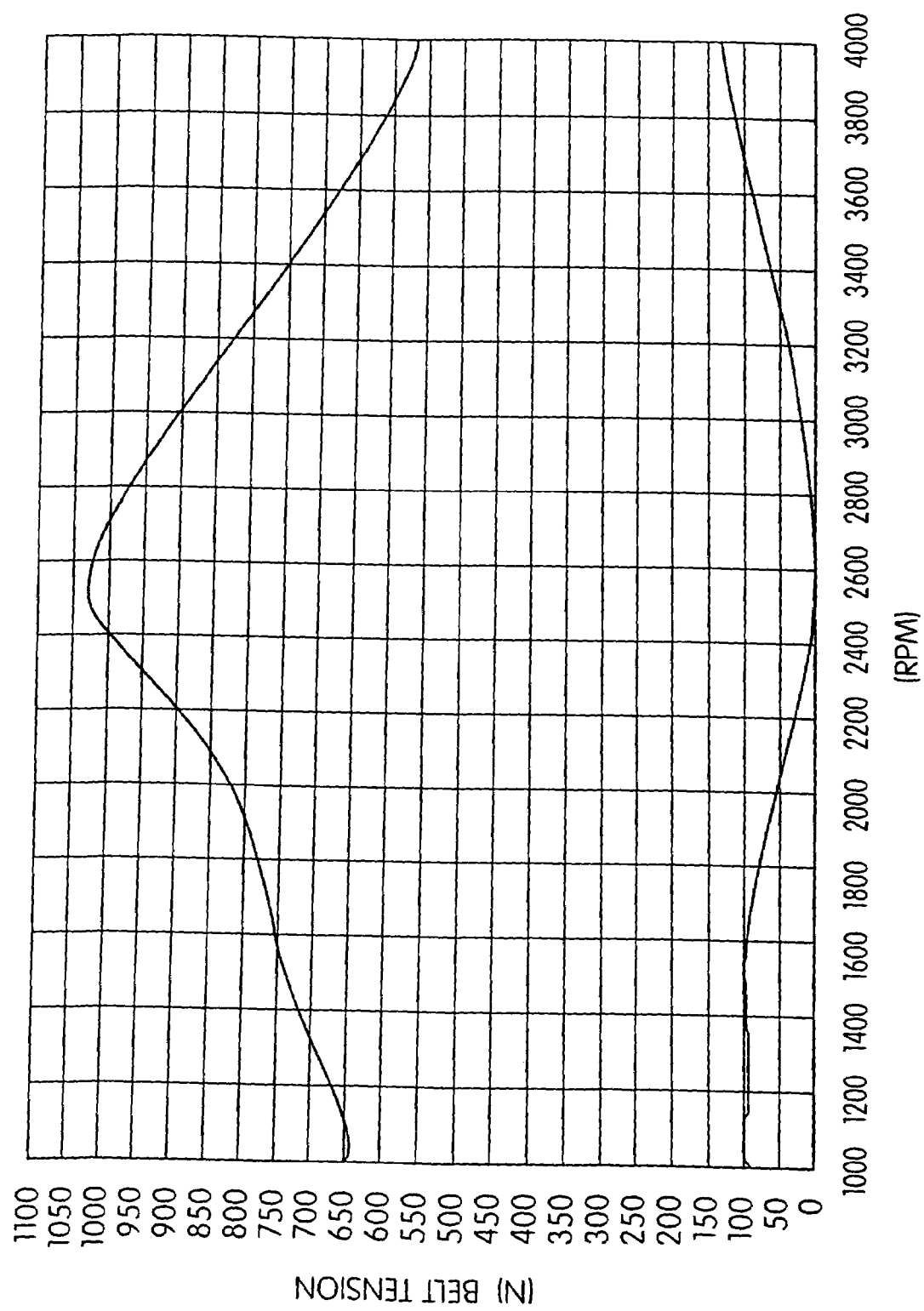
FIG. 8a is a graph illustrating the magnitude of tensions in an internal combustion engine at different engine speeds, the vertical axis indicating the amplitude of the belt tension, and the horizontal axis indicating engine speed in rpm, the graph indicating the situation in a known engine, having a round crankshaft sprocket.
Figure 8B:
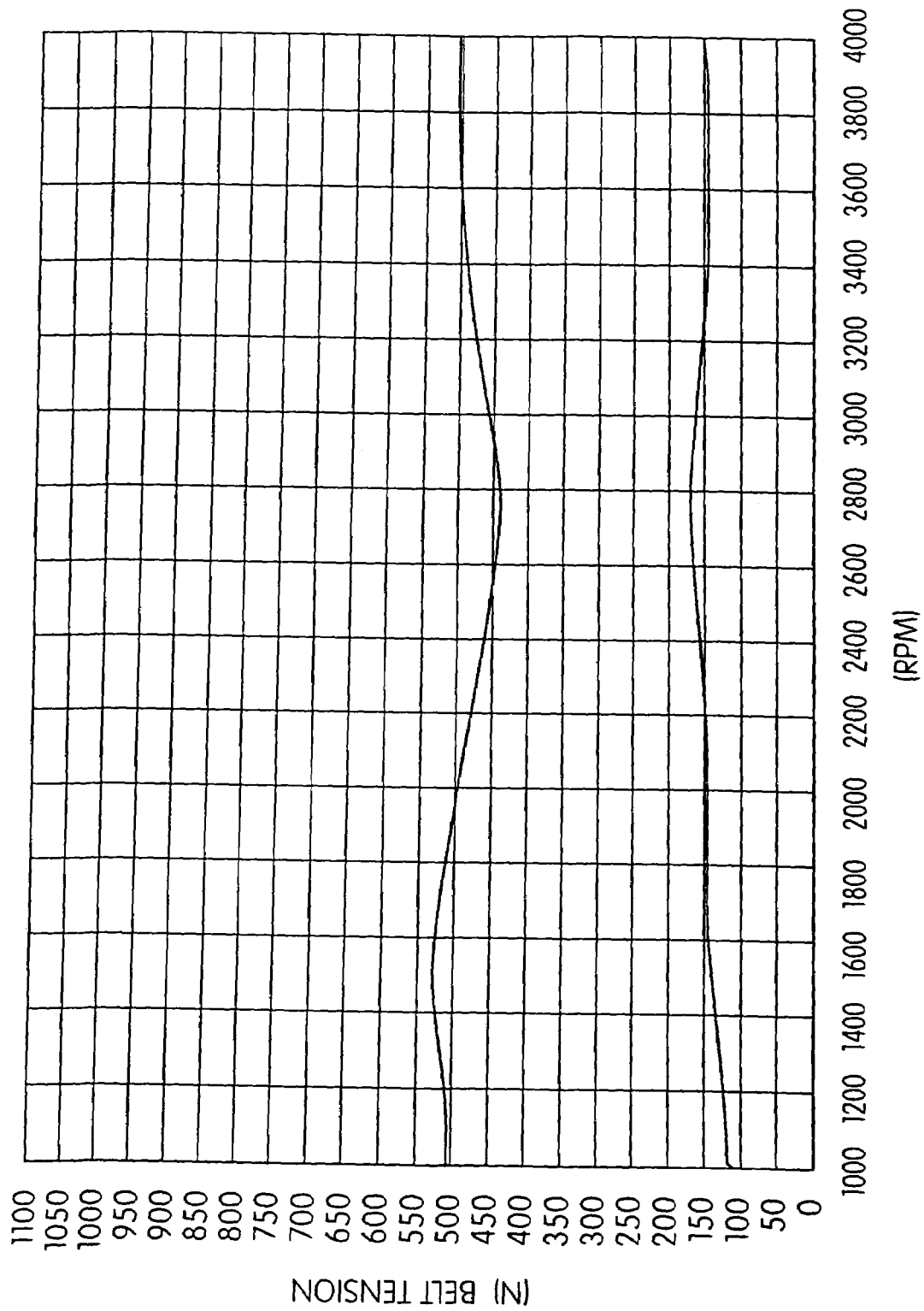
FIG. 8b is a graph illustrating the magnitude of tensions in an internal combustion engine at different engine speeds, the vertical axis indicating the amplitude of the belt tension, and the horizontal axis indicating engine speed in rpm, the graph indicating the situation for a synchronous drive apparatus embodying the invention, utilising an oval crankshaft sprocket.

FIG. 8a shows the tight side tension fluctuation versus the engine speed in rpm for a round crankshaft sprocket. FIG. 8b shows the tight side tension fluctuation versus the engine speed in rpm for an oval crankshaft sprocket. FIG. 8b also shows that resonance has been cancelled. Tension fluctuations are still present in the whole rpm range, but they need to be there to provide cancelling torque.

Figure 9A:
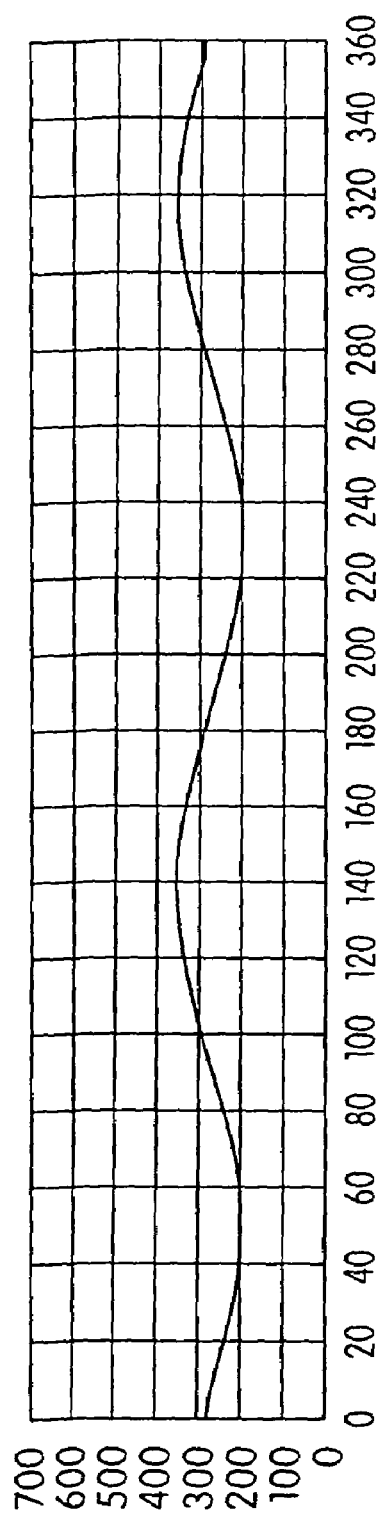
FIGS. 9a and 9b show respectively the fluctuations in tension in the drive belt over one revolution of the crankshaft at 1500 RPM, for an engine according to the prior art, having a round crankshaft sprocket, FIGS. 9a and 9b showing respectively the belt tension variations on the tight side and the slack slide of the crankshaft sprocket respectively.
Figure 9B:
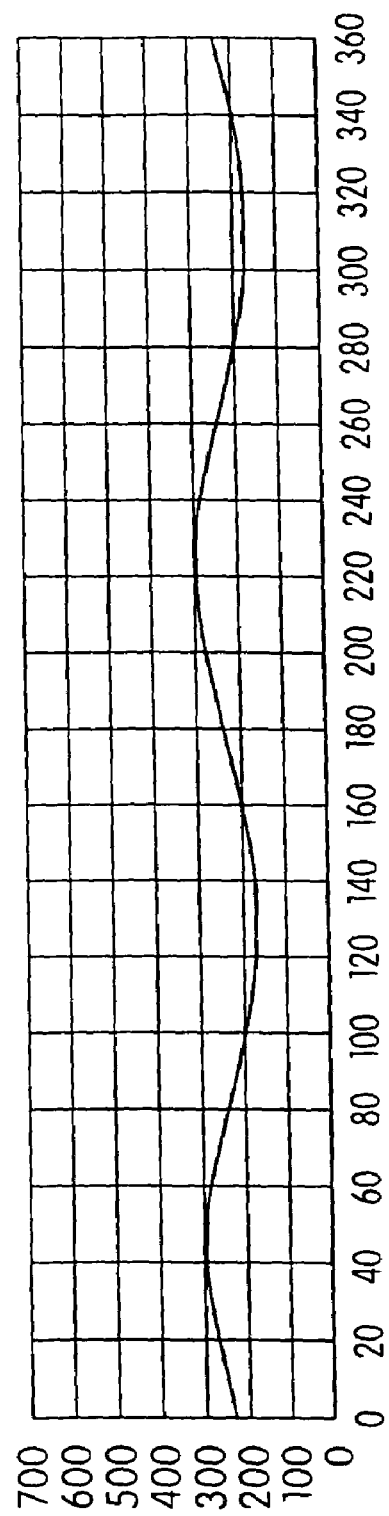
Figure 10A:
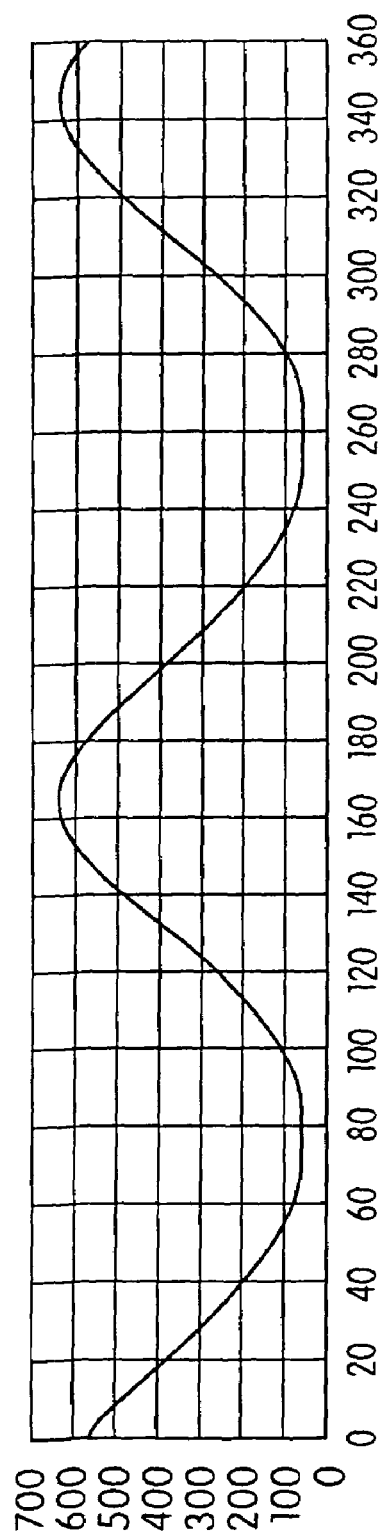
FIGS. 10a and 10b show respectively the fluctuations in tension in the drive belt over one revolution of the crankshaft at 2500 RPM, for an engine according to the prior art, having a round crankshaft sprocket, FIGS. 10a and 10b showing respectively the belt tension variations on the tight side and the slack slide of the crankshaft sprocket respectively.
Figure 10B:
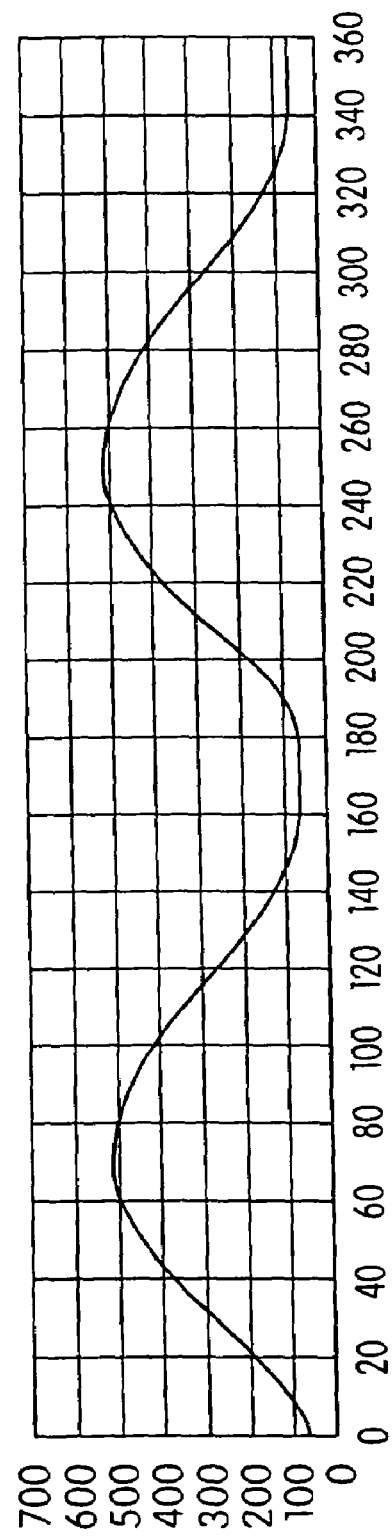
Figure 11A:
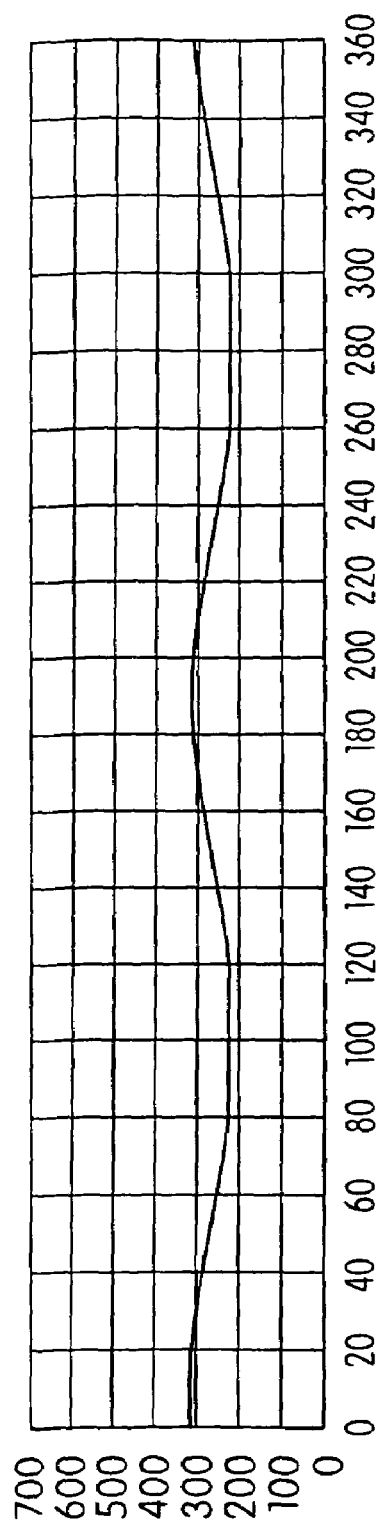
FIG. 11 show respectively the fluctuations in tension in the drive belt over one revolution of the crankshaft at 3500 RPM, for an engine according to the prior art, having a round crankshaft sprocket, FIGS. 11a and 11b showing respectively the belt tension variations on the tight side and the slack slide of the crankshaft sprocket respectively.
Figure 11B:
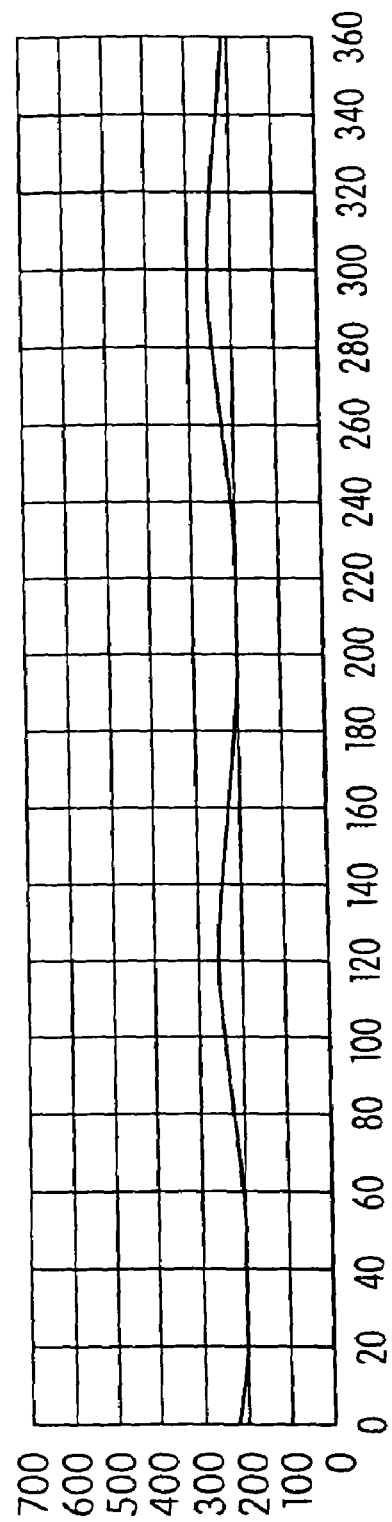

FIGS. 9a and b show the tight side and slack side tension fluctuations over one revolution of the round crankshaft sprocket at 1500 rpm. FIGS. 10a and b show the tight side and slack side tension fluctuations over one revolution of the round crankshaft sprocket at the system resonance (2500 rpm). FIGS. 11a and b show the tight side and slack side tension fluctuations over one revolution of the round crankshaft sprocket at 3500 rpm.

Figure 12:
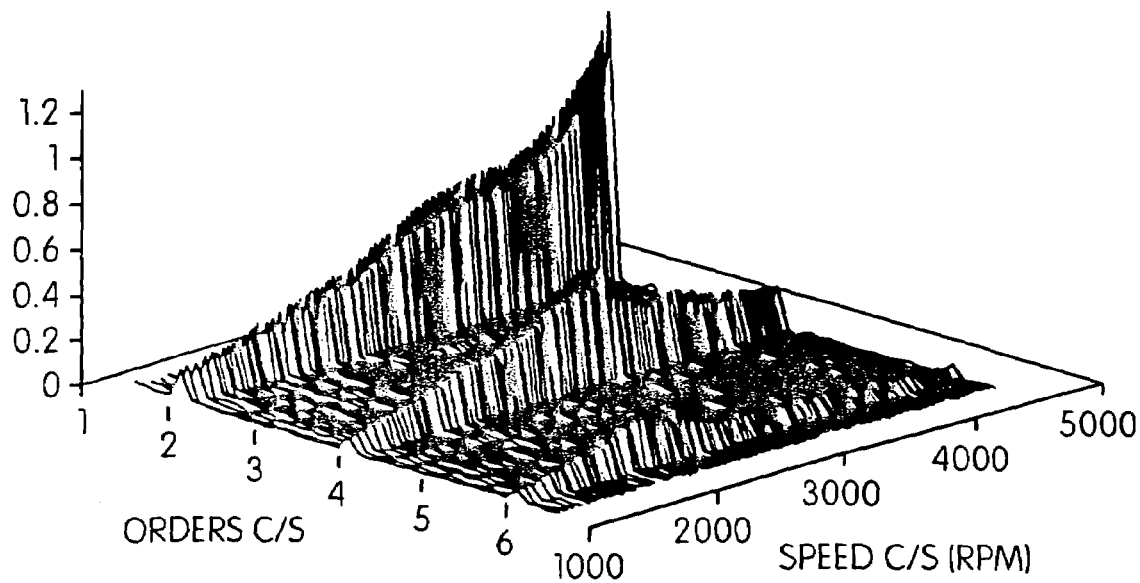
FIG. 12 is a three-dimensional graph showing the distribution of camshaft torsional vibrations in a known internal combustion engine having a round crankshaft sprocket, in which the X-axis indicates various harmonic orders of vibration, the Y-axis indicates engine speed in RPM, and the Z-axis indicates the amplitude of the camshaft torsional vibrations.

FIG. 12 shows the camshaft torsional vibrations for a round crankshaft sprocket presented as a spectral analysis where: x-axis=harmonics orders; y-axis=engine rpm; and z-axis=amplitude of the camshaft torsional vibrations.

Figure 13:
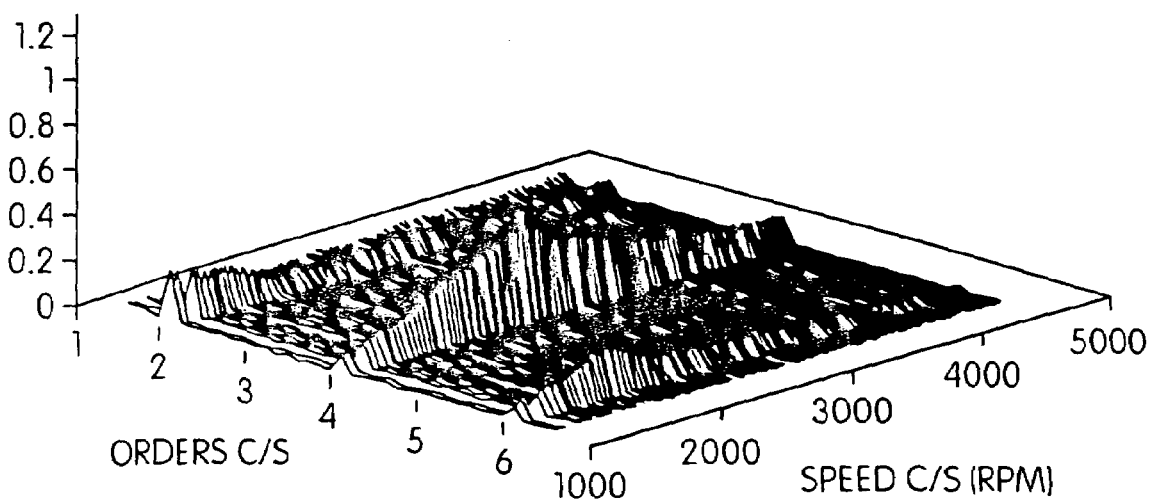
FIG. 13 is a three-dimensional graph showing the distribution of camshaft torsional vibrations in an engine embodying the invention and having an oval crankshaft sprocket, in which the X-axis indicates various harmonic orders of vibration, the Y-axis indicates engine speed in RPM, and the Z-axis indicates the amplitude of the camshaft torsional vibrations.

FIG. 13 shows the camshaft torsional vibrations for an oval crankshaft sprocket presented as a spectral analysis where: x-axis=harmonics orders; y-axis=engine rpm; and z-axis=amplitude of the camshaft torsional vibrations. Only second order torsionals are eliminated by the oval profile. Using a more complex profile, as shown in FIG. 14 will cancel simultaneously second and fourth order torsionals.

Figure 14A:
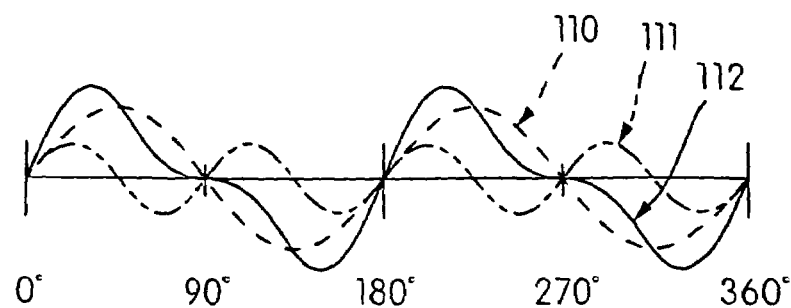
FIG. 14a shows a graph of fluctuating load torque on a rotary load assembly such as a camshaft.
Figure 14B:
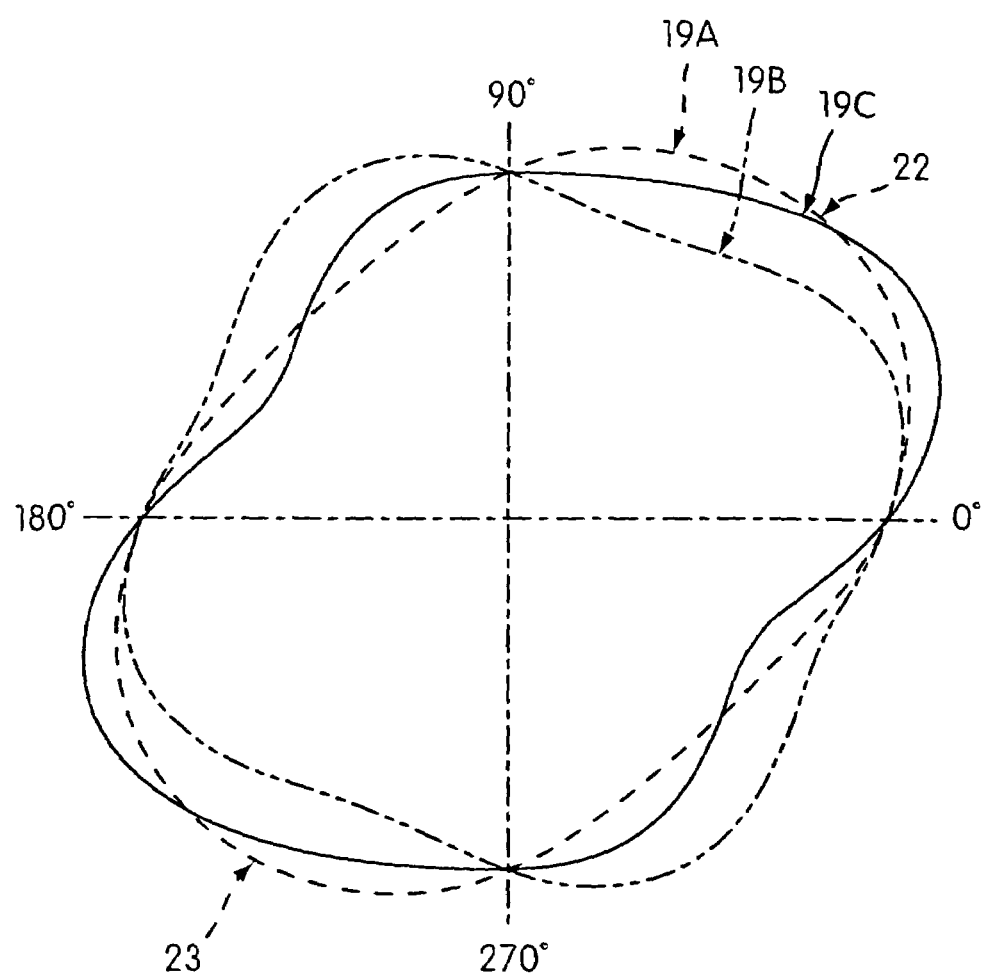
FIG. 14b shows how a non-circular profile 19 may be derived to cancel the torque fluctuations of FIG. 14a, in an embodiment of the invention.

FIGS. 14a and 14b show, in greatly exaggerated form, how a non-circular profile 19 of one of the rotors in a synchronous drive apparatus embodying the invention can be shaped to accommodate two different orders of torsional fluctuations in the torque of a rotary load assembly. FIG. 14 consists of two FIGS. 14a and 14b. FIG. 14a shows in curve 110 a second order fluctuating load torque, equivalent to the second order peak shown in FIG. 12. The curve 111 shows a fourth order fluctuating load torque equivalent to the fourth order peak shown in FIG. 12. Curve 112 shows the combined fluctuating load torque on the rotary load assembly.

In FIG. 14b there is shown at 19A in greatly exaggerated form a generally oval profile suitable for use on a crankshaft rotor 11 in FIG. 1, having protruding portions 22 and 23. These protruding portions produce a corrective fluctuating load torque which can be applied to cancel the second order fluctuating load torque 110 in FIG. 14a. A second profile indicated at 19B is shaped to have four minor protruding portions which, if it were to be used as a profile of crankshaft sprocket 11, would produce a corrective torque equivalent to the fourth order fluctuating load torque 111 in FIG. 14a. In FIG. 14b, a non-circular profile embodying the invention is indicated at 19C, which is a combination of the two profiles 19A and 19B. The combined profile 19C has two major protruding portions, and two minor protruding portions. The combined profile 19C produces a fluctuating corrective torque which can be made to cancel the combined fluctuating torque 112 shown in FIG. 14a.

Thus in FIG. 14, there is shown a modification of the oval rotor in which additional minor protruding portions of the profile are provided. The reason for this is to take account of fourth order harmonic torsional vibrations which are illustrated in FIGS. 12 and 13. In FIG. 12, there is shown the torsional vibrations which arise from the second, fourth and sixth order harmonics, with a synchronous drive apparatus having a circular crankshaft sprocket. FIG. 13 shows the torsional vibrations remaining after use of an oval crankshaft drive sprocket in accordance with the invention. It will be seen that the fourth order harmonic torsional vibrations remain. These vibrations can be reduced or eliminated by providing on the non-circular profile of the crankshaft sprocket additional protruding portions. The minor protruding portions are of lesser extent than the major protruding portions, and are arranged to produce lesser fluctuating corrective torque patterns in the torque applied to the second rotor, to reduce or substantially cancel the fourth order fluctuating load torque presented by the rotary load assembly.

Returning now to a general consideration of the operation of embodiments of the invention, it is known to provide in a synchronous drive system for an internal combustion engine a crankshaft sprocket of oval profile. The present invention provides for the correct selection of the eccentricity and the timing of the non-circular profile, to be that which advantageously cancels or reduces the fluctuating load torque in the load assembly, rather than endeavouring to equalise the tension in the drive belt, has as been done in the prior art arrangements.

The invention can be understood by considering Newton's second law, that the presence of an unbalanced force will accelerate an object. For linear examples this provides:

$$\text{Acceleration} = \text{Force}/\text{Mass}$$

In rotary motion:

$$\text{Acceleration} = \text{Torque}/\text{Inertia}$$

In an ordinary internal combustion engine the torque from the valve train or diesel fuel pump fluctuates, causing the speed to fluctuate, causing angular displacement to fluctuate (also known as torsional vibration). By using an ellipsoidal crankshaft sprocket that is pulling the belt (at appropriate instant) additional torque can be created that has such amplitude and phase that the combined torque acting on the camshaft is zero. Absence of torque means absence of acceleration by first Newton's law. Absence of acceleration means absence of speed fluctuations, which means that no torsionals are present.

The opening and closing of the intake and exhaust valves is a source of torque fluctuations. These torque fluctuations cause the camshaft to be inflicted with speed fluctuations, which in turn, causes angular position fluctuations otherwise know as torsional vibrations. The best cure for that behaviour is to attack the cause right at the source by introducing another torque acting on the camshaft i.e. removing torque fluctuations at the camshaft. One way of doing it is to use the oval sprocket at the crankshaft. The oval sprocket, while rotating, will introduce fluctuations of span length i.e. will pull and relieve two times per one crankshaft revolution. When the tight side is being pulled, the slack side is relieved and vice versa. Pulling and relieving the belt means that a new, additional torque is generated at the camshaft. If this new torque is of appropriate amplitude and phase it can balance the first torque from the valve train. Absence of torque fluctuations means absence of speed fluctuations and therefore absence of torsionals.

In embodiments of the invention, when the torsional vibrations in the camshaft are eliminated the belt tension still varies. Indeed it is the variation in tension in the belt, which causes the torsional vibrations in the camshaft to cease. In the prior art, the objective is said to be the removal of tension variation in the belt, which is not what is needed to remove torsional vibration in the camshaft. The object is to remove the variation in speed of the driven sprocket, which is caused by variation in torque load in the driven sprocket. This is done by varying the tension in the belt during the cycle of the driven sprocket. At a time of increase of torque load on the driven sprocket, there must be an increase in tension in the belt. At moment when increase in tension is required the effective length of the span must be increased. This is achieved by having the oval positioned so that the long axis is moving from a position perpendicular to the hub load, to position along the hub load direction. At the moment when decrease in tension is required the effective length of the span must be decreased. This is done while the major axis moves from vertical to horizontal.

What is claimed is:

1. A synchronous drive apparatus, comprising:
a continuous-loop elongate drive structure having a plurality of engaging sections;
a plurality of rotors comprising at least a first and a second rotor, the first rotor having a plurality of teeth for engaging the engaging sections of the elongate drive structure, and the second rotor having a plurality of teeth for engaging the engaging section of the elongate drive structure;
a rotary load assembly coupled to the second rotor;
the elongate drive structure being engaged about the first and second rotors, the first rotor being arranged to drive the elongate drive structure and the second rotor being arranged to be driven by the elongate drive structure, and one of the rotors having a non-circular profile having at least two protruding portions alternating with receding portions, the rotary load assembly being such as to present a periodic fluctuating load torque when driven in rotation;
wherein the angular positions of the protruding and receding portions of the non-circular profile relative to an angular position of the periodic fluctuating load torque present on the second rotor, and the magnitude of the eccentricity of the non-circular profile enables the rotor having the non-circular profile to apply to the second rotor an opposing fluctuating corrective torque which reduces or substantially cancels the fluctuating load torque of the rotary load assembly.

2. A synchronous drive apparatus according to claim 1, in which the non-circular profile is such as to produce the said opposing fluctuating corrective torque by periodic elongation and contraction of the spans of the elongate drive structure adjoining the rotor on which the non-circular profile is formed, the elongate drive structure having a drive span on the right side of the rotor on which the non-circular profile is formed, the angular position of the non-circular profile being within +/−15 degrees of an angular position for which a maximum elongation of the said drive span coincides with a peak value of the fluctuating load torque of the rotary load assembly.

3. A synchronous drive apparatus according to claim 2, in which the angular position of the non-circular profile is within +/−15 degrees of the angular position for which a maximum elongation of the said drive span coincides with a peak value of the fluctuating load torque of the rotary load assembly.

4. A synchronous drive apparatus according to claim 2, in which the angular position of the non-circular profile is that for which a maximum elongation of the said drive span substantially coincides with a peak value of the fluctuating load torque of the rotary load assembly.

5. A synchronous drive apparatus according to claim 1, in which the magnitude of the eccentricity of the non-circular profile is such that the fluctuating corrective torque has an amplitude in the range of 70% to 130% of the amplitude of the fluctuating load torque at a predetermined selected set of operating conditions of the synchronous drive apparatus.

6. A synchronous drive apparatus according to claim 5, in which the said range consist of 90% to 100% of the amplitude of the fluctuating load torque.

7. A synchronous drive apparatus according to claim 5, in which the amplitude of the fluctuating corrective torque is substantially equal to the amplitude of the fluctuating load torque.

8. A synchronous drive assembly according to claim 1, in which the amplitude of the fluctuating load torque of the rotary load assembly is substantially constant, and the magnitude of the eccentricity of the non-circular profile is such that the fluctuating corrective torque has an amplitude in the range of 70% to 110% of the amplitude of the fluctuating load torque.

9. A synchronous drive apparatus according to claim 8, in which the said range consists of 90% to 100% of the amplitude or the fluctuating load torque.

10. A synchronous drive apparatus according to claim 8, in which the amplitude of the fluctuating corrective torque is substantially equal to the amplitude of the fluctuating load torque.

11. A synchronous drive assembly according to claim 1, in which the amplitude of the fluctuating load torque of the rotary load assembly varies, and the magnitude of the eccentricity of the non-circular profile is such that the fluctuating corrective torque has an amplitude in the range of 70% to 110% of the amplitude of the fluctuating load torque when determined at conditions such that it is a maximum.

12. A synchronous drive apparatus according to claim 11, in which the said range consist of 90% to 100% of the amplitude of the fluctuating load torque when determined at conditions such that it is a maximum.

13. A synchronous drive apparatus according to claim 11, in which the amplitude of the fluctuating corrective torque is substantially equal to the amplitude of the fluctuating load torque when determined at conditions such that it is a maximum.

14. A synchronous drive assembly according to claim 1, in which the amplitude of the fluctuating load torque of the rotary load assembly varies, and the magnitude of the eccentricity of the non-circular profile is such that the fluctuating corrective torque has an amplitude in the range of 70% to 110% of the amplitude of the fluctuating load torque when determined at the natural resonance frequency of the apparatus.

15. A synchronous drive apparatus according to claim 14, in which the said range consists of 90% to 100% of the amplitude of the fluctuating load torque when determined at the natural frequency of the apparatus.

16. A synchronous drive apparatus according to claim 14, in which the amplitude of the fluctuating corrective torque (104) is substantially equal to the amplitude of the fluctuating load torque when determined at the natural frequency of the apparatus.

17. A synchronous drive apparatus according to claim 1 in which the said non-circular profile is provided on the first rotor.

18. A synchronous drive apparatus according to claim 1, in which the said non-circular profile is provided on the second rotor.

19. A synchronous drive apparatus according to claim 1, in which the non-circular profile is provided on a third rotor.

20. A synchronous drive apparatus according to claim 19, in which the third rotor comprises an idler rotor urged into contact with the continuous loop elongate drive structure, the third rotor having a plurality of teeth for engaging the engaging sections of the elongate drive structure.

21. A synchronous drive apparatus according to claim 1, when installed in an internal combustion engine, the said first rotor comprising a crankshaft sprocket.

22. A synchronous drive apparatus according to claim 1, in which the said non-circular profile is a generally oval profile.

23. A synchronous drive apparatus according to claim 1, in which the said non-circular profile has three protruding portions arranged regularly around the rotor.

24. A synchronous drive apparatus according to claim 1, in which the said non-circular profile has four protruding portions arranged regularly around the rotor.

25. A synchronous drive apparatus according to claim 1, in which the said protruding portions constitute major protruding portions and the said receding portions constitute major receding portions, and the non-circular profile includes additional minor protruding portions of lesser extent than the major protruding portions, adapted to produce additional, minor, fluctuating corrective torque patterns in the torque applied to the second rotor, to reduce or substantially cancel subsidiary order fluctuating load torque presented by the rotary load assembly.

26. A synchronous drive apparatus according to claim 1, in which the continuous-loop elongate structure is toothed belt.

27. A synchronous drive apparatus according to claim 1, in which the continuous-loop elongate structure is a drive chain.

28. A synchronous drive apparatus according to claim 1, wherein the magnitude of eccentricity of the non-circular profile is between 0.5 mm to 1.5 mm.

29. A synchronous drive apparatus according to claim 1, wherein the one of the rotors having the non-circular profile is constructed and arranged so that the angular position of a reference radius and the magnitude of the eccentricity of the non-circular profile is such that the non-circular profile applies to the second rotor an opposing fluctuating corrective torque which reduces or substantially cancels the fluctuating load torque of the rotary load assembly by increasing the tension in the elongate drive structure at the same time when the load torque on the second rotor increases due to the rotary load assembly presenting a periodic fluctuating load torque.

30. A rotor for use with a synchronous drive apparatus including a continuous-loop elongate drive structure having a plurality of engaging sections and a rotary load assembly that presents a periodic fluctuating load torque when driven rotation, said rotor comprising:
   a plurality of teeth structured to be engaged with the engaging sections of the elongate drive structure; and
   a non-circular profile having at least two protruding portions alternating with receding portions,
   wherein the angular positions of the protruding and receding portions of the non-circular profile, and the magnitude of the eccentricity of the non-circular profile enables the rotor to apply to the second rotor an opposing fluctuating corrective torque which reduces or substantially cancels the fluctuating load torque of the rotary load assembly.

31. A rotor according to claim 30, wherein the magnitude of eccentricity of the non-circular profile is between 0.5 mm to 1.5 mm.

32. A rotor according to claim 30, wherein the magnitude of eccentricity is measured along a major axis of the non-circular profile.

33. A rotor according to claim 30, wherein the magnitude of eccentricity is measured as a difference between the non-circular profile along said major axis and a reference circle.

34. A rotor according to claim 33, wherein the reference circle is a circle having a diameter equal to the average of a length of the major axis and a length of a minor axis of the non-circular profile.

* * * * *